United States Patent [19]
Olson

[11] Patent Number: 6,047,319
[45] Date of Patent: *Apr. 4, 2000

[54] NETWORK TERMINAL SERVER WITH FULL API IMPLEMENTATION

[75] Inventor: Gene H. Olson, Minneapolis, Minn.

[73] Assignee: Digi International Inc., Minnetonka, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/682,407

[22] Filed: Jul. 17, 1996

Related U.S. Application Data

[63] Continuation of application No. 08/213,197, Mar. 15, 1994, abandoned.

[51] Int. Cl.[7] .................................................. G06F 13/00
[52] U.S. Cl. ...................... 709/223; 709/220; 713/100; 710/72
[58] Field of Search ..................................... 395/682, 681, 395/712, 800, 200.52–200.55, 651; 709/220–229; 713/1–100; 710/72

[56] References Cited

U.S. PATENT DOCUMENTS

| | | | |
|---|---|---|---|
| 3,676,858 | 7/1972 | Fench et al. | 395/200.58 |
| 4,423,507 | 12/1983 | Roger et al. | 370/89 |

(List continued on next page.)

FOREIGN PATENT DOCUMENTS

| | | |
|---|---|---|
| 0454558 | 10/1991 | European Pat. Off. . |
| 0493215 | 7/1992 | European Pat. Off. . |

OTHER PUBLICATIONS

"Users of Novell's PC net works now can branch out" Dave Helderbrano 1989.

"Advanced Programming in the Unit Environment" W. Richard Stevens 1992, pp 325–343, 490–514, 631–658.

"Method to Send Input/Output Controls to a High Function Terminal", IBM Technical Disclosure Bulletin, vol. 31, No. 1, p. 46, (Jun. 1988).

Corollary, Inc., "CNS–010 Installation and User's Guide," ©1993, pp. 1–101.

DigiBoad, "The DigiBoard C/X System High Performance Cluster Controller Technology for ISA, EISA and Micro Channel Platforms," ©1993, 4 pages.

*Primary Examiner*—Paul R. Myers
*Attorney, Agent, or Firm*—Schwegman, Lundberg, Woessner & Kluth, PA

[57] ABSTRACT

A terminal server for providing communication between a host computer and a synchronous, asynchronous or parallel communications port across a general purpose network is provided utilizing a unique device driver interface and multiplexing communication protocol. The server communicates data and control commands for multiple ports on a single connection, thereby reducing demands on the network. In addition, genuine TTY devices are made available across the general purpose network which have all the characteristics of local communication ports. The present invention also makes possible access to the ports on the server to multiple host computers located on the network, allowing fair access to shared resources such as modems and printers. Finally, the invention can also be implemented in hardware, further increasing compatibility with existing host computer software and further reducing host computer overhead.

17 Claims, 7 Drawing Sheets

U.S. PATENT DOCUMENTS

| | | | |
|---|---|---|---|
| 4,817,130 | 3/1989 | Frimmel, Jr. | 379/88 |
| 4,823,122 | 4/1989 | Mann et al. | 340/825.28 |
| 4,885,789 | 12/1989 | Burger et al. | 380/25 |
| 4,972,368 | 11/1990 | O'Brien et al. | 364/900 |
| 4,975,904 | 12/1990 | Mann et al. | 370/85.1 |
| 4,975,905 | 12/1990 | Mann et al. | 370/85.1 |
| 5,187,708 | 2/1993 | Nakatani et al. | 370/85.1 |
| 5,222,062 | 6/1993 | Sharma et al. | 370/56 |
| 5,228,137 | 7/1993 | Kleinerman et al. | 395/500 |
| 5,257,369 | 10/1993 | Skeen et al. | 395/650 |
| 5,265,239 | 11/1993 | Ardolino | 395/500 |
| 5,301,275 | 4/1994 | Vanbuskirk et al. | 395/500 |
| 5,323,393 | 6/1994 | Barrett et al. | 370/85.8 |
| 5,341,499 | 8/1994 | Doraugh | 395/700 |
| 5,355,365 | 10/1994 | Bhat et al. | 370/85.13 |
| 5,355,453 | 10/1994 | Row et al. | 395/200 |
| 5,379,296 | 1/1995 | Johnson et al. | 370/60 |
| 5,426,421 | 6/1995 | Gray | 395/200.53 |
| 5,463,625 | 10/1995 | Yasrebi | 370/85.13 |
| 5,469,545 | 11/1995 | Varbuskirk et al. | 395/200.01 |
| 5,471,521 | 11/1995 | Minakami et al. | 379/88 |
| 5,475,601 | 12/1995 | Hwang | 364/473 |
| 5,559,958 | 9/1996 | Farrand et al. | 395/183.03 |
| 5,568,525 | 10/1996 | Nijs et al. | 375/356 |
| 5,581,703 | 12/1996 | Baugher et al. | 395/200.06 |
| 5,596,579 | 1/1997 | Yasrebi | 395/678 |
| 5,619,655 | 4/1997 | Weng et al. | 395/200.56 |
| 5,640,595 | 6/1997 | Baugher et al. | 395/830 |
| 5,666,534 | 9/1997 | Gilbert et al. | 395/651 |
| 5,696,901 | 12/1997 | Konrad | 395/200.33 |
| 5,754,789 | 5/1998 | Nowatzyk et al. | 395/200.65 |
| 5,812,879 | 9/1998 | Moro | 710/62 |

NETWORK TERMINAL SERVER WITH FULL API IMPLEMENTATION

This application is a continuation of Ser. No. 08/213,197 Mar. 15, 1994 abandoned.

FIELD OF THE INVENTION

This invention relates to the field of communication between digital devices such as computers and computer related peripherals across a general purpose network.

BACKGROUND OF THE INVENTION

The need for digital computers to communicate to each other and to remotely located computer peripherals has long been felt. Numerous technologies have been designed to meet this need, including the use of modems for establishing long distance links over the analog phone network and the creation of networking technologies which allow computers and peripherals to communicate over a data transmission medium.

Modems are used in pairs to establish communication between two computers, with each modem being attached to the serial port of its local computer as well as connected to the analog telephone network. The serial port is a standard interface port on the computer which allows the computer to pass a serial bit stream of information to a peripheral such a modem or a printer. On UNIX based computers and other multi-user computer systems, this same serial port is used for communication with the terminals which allow users to interact with the computer. As a result, it is a relatively simple matter to utilize a modem to allow a remotely located terminal to communicate with a multi-user computer system over the phone lines.

Because modern multi-user computers are capable of supporting numerous simultaneous users, it is desirable to have a number of serial ports through which terminals can communicate with the computer. Unfortunately, mounting all of the serial ports directly onto the computer can be logistically difficult, since multi-user computers can often support more than fifty terminal connections. As a result, multiplexors have been utilized to combined serial traffic from numerous, internally referenced serial ports into a single communication channel. In this way, only one communication cable needs to be attached to the computer. On the other end of the communication cable is another multi-plexing device, which separates the combined data traffic into data for individual serial ports, and then provides the serial ports through which this data can be accessed. This type of multiplexing device, called a ports concentrator, can be used to provide multiple serial ports for terminals in a location remote from the computer. It is even possible to use multiplexing in a system which allows the data on the main communication cable to be transported across phone lines using modems. This allows multiple serial ports to be accessible at great distances from the computer.

Networking technology can also be utilized to allow remote communication between a computer and another computer or peripheral. Networks which connect computers and peripherals within a relatively small area are referred to as Local Area Networks, or LANs. A general purpose network is a communication system utilizing standard hardware and standard communication protocols, and operating in a multi-vendor environment. General purpose network hardware includes LAN technologies like Ethernet and Token Ring. Standard Network protocols include TCP/IP and SPX/IPX.

LANs are generally formed by connecting computers and peripherals together through a transmission medium, and then communicating over the medium by following standardized communication protocols. These protocols set forth such requirements as to how data should be formatted and how data is designated for a particular device. Data cannot be sent over the network without conforming to these protocols.

Application programs on a host operating system generally depend strongly on the Application Program Interfaces (API) for local communication devices provided by the host operating system. This is especially important on systems like UNIX, whose traditional user interface is terminal command line operation.

General purpose networks most often support two types of communication, a connectionless unreliable datagram service and a reliable bi-directional bytesteam connection. The API to both of these services is very different from the serial port API, and in general programs written to run on serial devices (known as TTYs) require an adaptation layer to run correctly.

In the UNIX environment this is generally done with the network protocols Telnet and Rlogin using a virtual TTY device known as a pseudo-tty or PTTY device. PTTY devices are software entities, not hardware entities, that emulate UNIX TTYs well enough that most command line programs will run with them.

It is important to distinguish these PTTYs from genuine TTYs associated with and controlling actual serial port hardware. A PTTY has a slave side and a master side. The slave side of the PTTY is the TTY emulation device, and is used by programs that require the serial port API to function. The master side interfaces to a network program, such as Telnet or Rlogin, that can send data across the network.

The slave side of the PTTY accepts requests to change user options like line editing characters, tab expansion, and other functions done by the line discipline of the local operating system. However it ignores requests to change baud rate, character size, action on received errors and BREAK signals, and the like.

The master side of the PTTY accepts reads, writes, and a very limited set of input output controls (ioctls) to change the way data is passed back and forth between the slave and master devices. Data written to the master side of the PTTY appears as received serial data on the slave side of the PTTY, as though it had been received on a serial port, and is processed as input serial data by the line discipline of the operating system. The data then appears as received data when read from the slave side of the PTTY. Data written to the slave PTTY is likewise processed as serial output data by the UNIX line discipline, after which it can be read on the master side.

Ioctl operations made to the slave side of the PTTY are invisible to the master side, hence it is not possible for the program accessing the master side of the PTTY to detect that these calls have been made. The interface is just not rich enough to support any operations that cannot be done in the line discipline of the local operating system.

It should also be noted that in most implementations, there is not a one-to-one correspondence between physical devices and PTTYS. When a connection is made into a UNIX system by Telnet or Rlogin, these program simply allocate the next available PTTY for the session. Hence from session to session a network user is likely to get different PTTY devices, in no obvious pattern. This makes it difficult or impossible to enforce system security or user options based on pseudo-tty devices. To overcome this to some extent, ad-hoc programs are commonly written by terminal server vendors that can be attached to the master side of a particular PTTY, so that the slave side of that PTTY remains attached to that program and is not periodically reallocated to another use. Such programs can be used for incoming connects and running login programs, but are most often used to simulate dial-out modems, printers, or direct connect serial devices. This use expands the PTTY to other uses than Telnet and Rlogin, but because of their limited emulation of a genuine TTY device, they require varied workarounds and cause continual maintenance and compatibility problems.

Telnet also uses TCP/IP flow control for port data flow control and sends commands in sequence with the data so that commands cannot be processed until the data ahead of them in the data stream have also been processed. As a result, Telnet requires the use of the expedited data feature of TCP/IP to send certain commands such as user requested interrupts. The implementation of this requires that data ahead of the user interrupt be discarded before the interrupt can be processed.

Unfortunately, this procedure can place a tremendous strain on the host computer as well as the network itself. For instance, when typing on a remote terminal connected through the network, each keystroke is processed, sent over the network to the host computer, and then echoed back over the network to the remote terminal. On an Ethernet network, a transmitted character must be transmitted on a 64 byte minimum size message packet and the acknowledge also requires a 64 byte message packet. Thus, two 64-byte packets must be transmitted for each character typed.

In addition, the receiving of the character by the host computer requires a task switch to run the PTTY control software to receive the character, and a task switch back to the PTTY control software to transmit the echo character.

Devices called terminal servers make remote logins, utilizing the TELNET and RLOGIN commands, available to users through a serial port without requiring the users to be logged onto a computer on the network. A user connected to a serial port on the terminal server can use RLOGIN or TELNET to connect to a multi-user computer on the network. A second user on the terminal server could also connect to the same multi-user computer, and thereby establish a second communications link with its own PTTY assigned to it. Connection made by the terminal server through TELNET, RLOGIN and similar procedures of course embody the same disadvantages as connection made using those procedures through a different computer on the network.

SUMMARY OF THE INVENTION

The present invention comprises a communication system which overcomes the disadvantages of the prior art by allowing a host computer full access to the asynchronous ports located on a remote terminal server across a general purpose network. By utilizing a unique device driver interface and multiplexing communication protocol, the server is able to communicate data and control commands for multiple ports on a single connection, thereby reducing demands on the network. In addition, the present invention provides genuine TTY devices across the network which have all the characteristics of local communication ports. The present invention also makes possible access to the ports on the server to multiple host computers located on the network, allowing fair access to shared resources such as modems and printers. Finally, the invention can also be implemented in hardware, further increasing compatibility with existing host computer software and further reducing host computer overhead.

The present invention operates over the reliable communication link provided by a general purpose network between a client (usually a host computer) who wishes to access or provide access to remote communication ports and a server that incorporates such ports.

The present invention differs from traditional PTTY implementations in that it provides genuine TTY devices across a general purpose network. Unlike the PTTY implementations, the TTYs of the current invention have a one-to-one correspondence with actual hardware, and allow the host operating system to control that hardware as if the serial ports were directly connected to the host operating system and dedicated to this use.

Where it does not interfere with the assumptions made by application programs, the current invention then loosens these restrictions, and extends the functionality of these ports to allow sharing with other hosts on the network, and with dynamic port allocation with PBX-style hunt groups. The present invention allows each operating system to maintain a one-to-one correspondence with genuine TTYs, but can optionally allow those TTYs to be accessed for other purposes when they are not currently in use by the current operating system.

Each client that wishes to use one or more ports on the server opens a single connection to that server utilizing the protocol provided by the present invention (the "Communication Protocol"). All communication between the client and server which uses the Communication Protocol then proceeds using this single connection, no matter how many ports are used by the client. Additional connections between the client and server may be opened under prior art protocols such as Telnet and Rlogin, however the existence of these prior art protocol connections does not affect the ports under the control of the present invention's Communication Protocol. When the connection between the client and server is broken for any reason, all the ports under Communication Protocol control are closed, and all resources claimed by that client are returned.

The existence of a Communication Protocol connection does not automatically grant the client access to all port resources on the server. Before the client accesses a port, the client must first successfully OPEN the port, after which time the client is granted exclusive access to the port until the client CLOSES the port.

Once a port is opened, the client may send requests to change baud rate, control modem settings, and the like. The client may send data out the port, and the server automatically sends the client all data received in the port. Under the Communication Protocol, the client may request status updates from the server. The updates can be made immediately upon request, or the client may request the server inform the client of any changes to various status conditions (such as modem input signals) as they change.

DETAILED DESCRIPTION OF THE INVENTION

Figure 1:
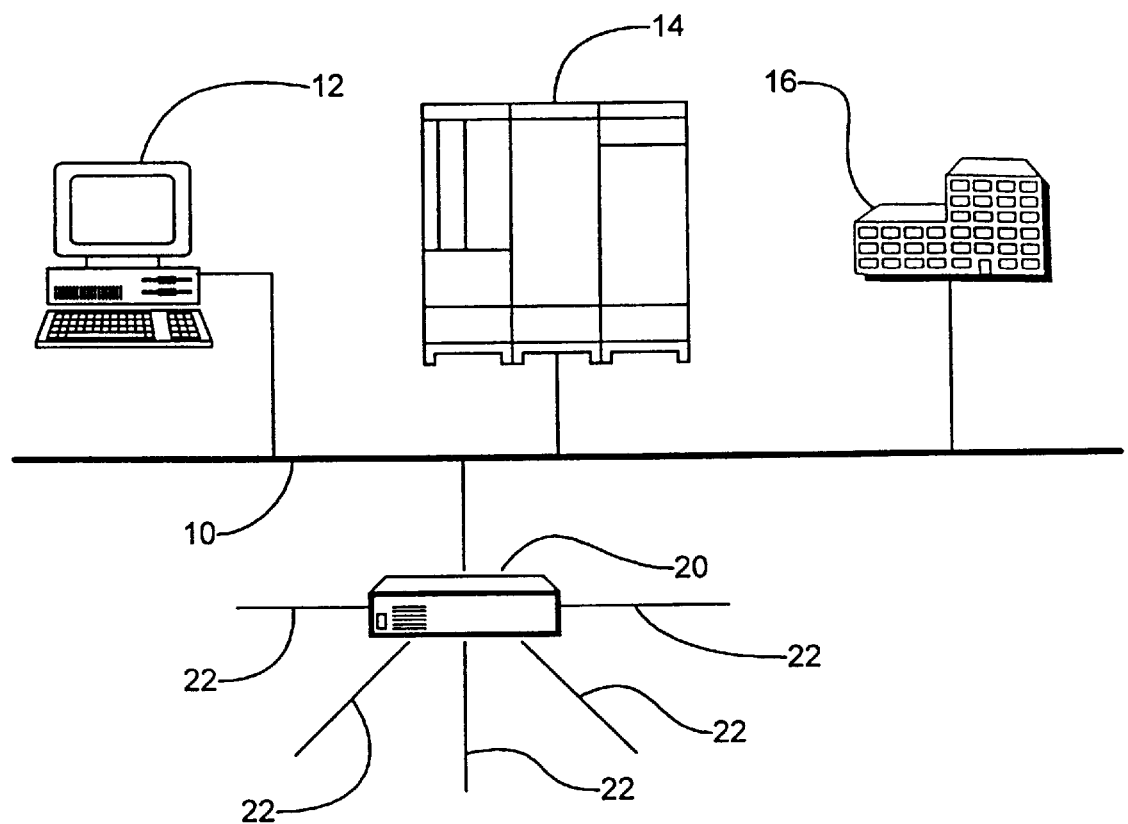
FIG. 1 illustrates a general purpose computer networking linking a variety of host computers and a server of the present invention.

FIG. 1 shows a general purpose network 10 interconnecting a variety of computers including a UNIX computer 12, a Digital Equipment Corporation's VAX computer 14 and a Novell Network of PCs at a particular location 16. The network 10 can utilize any of a variety of standard networking communication protocols, such as TCP/IP, SPX/IPX and X.25, as long as the protocol provides for error free byte stream data transmission. The communication protocol operates on a specific logical topology such as Ethernet or Token Ring.

A typical network connecting the computers and networks shown in FIG. 1 would utilize the TCP/IP protocol running on top of Ethernet. The TCP portion of the protocol takes byte stream data and converts it to packets. The IP portion takes the packets and forms datagrams, while Ethernet takes the datagrams and forms frames. This typical configuration will be utilized for the purpose of explaining the present invention, although the invention itself is independent of the network protocol utilized.

A server 20 of the present invention operates to connect various ports (not shown) to the network 10. Communication lines 22 can be connected to the ports on the server 20. Although only five communication lines 22 are shown in FIG. 1, the server 20 typically has sixteen or more ports which can be connected to the network 10.

Figure 2:
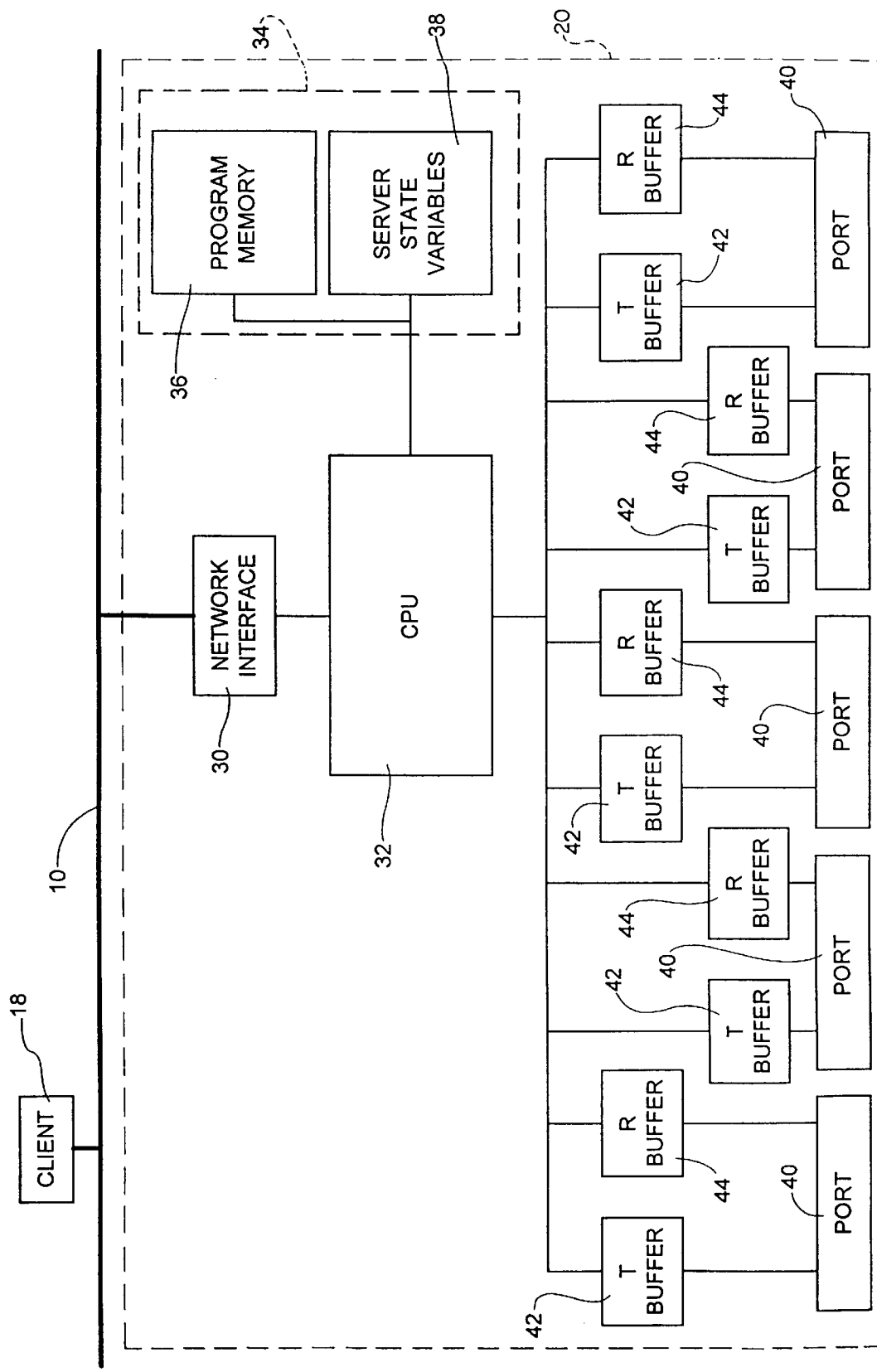
FIG. 2 illustrates a client computer attached across a general purpose network to a server of the present invention, including the critical components of the server.

FIG. 2 shows the primary elements of the communication between one or more clients 18 and the server 20 across a general purpose network 10. The client 18 can be a host computer such as a UNIX computer 12 or a VAX computer 14, or even a local area network 16. The server 20 is connected to the network 10 through the server's network interface 30. The network interface 30 provides the industry standard hardware and software control necessary for the server 20 to communicate over the network 10 in the same way as any other device on the network 10. As with all industry standard network interfaces, the network interface 30 is capable of receiving data frames from the network 10, determining whether the data is addressed to server 20, and, if so, make the data available in a byte stream form by removing the network formatting and reassembling the frames, datagrams and packets. In other words, the network interface 30 of the present invention contains the functionality of the Transport, Network, Link and Physical layers of the International Standards Organization Open Systems Interconnection (ISO/OSI) model.

The byte stream data provided by the network interface 30 is then supplied to a central processing unit (CPU) 32, which coordinates the implementation of the Communication Protocol of the present invention. The program modules necessary for implementation of the Communication Protocol are stored in the program memory portion 36 of the server memory 34.

After the CPU 32 has analyzed the data received from the network interface 30, raw data is passed through to the appropriate port 40 on server 20. The ports 40 on the server 20 may be asynchronous, synchronous or parallel ports. Attached to the ports 40 may be a variety of devices, such as terminals, printers or modems.

Data that is sent from the client 18 for transmission through the ports 40 is stored in an output or transmit buffer 42 until the port 40 is ready to transmit the data. Data that is sent into the server 20 through the ports 40 is handled similarly. The data coming from port 40 for transmission to the client 18 is stored in input or receive buffer 44 until it is ready to be transmitted over the network 10 to the client 18. The Communication Protocol of the present invention is executed by the CPU 32 and the step of formatting the byte stream transmission into the frames, datagrams and packets required on the network 10 is handled by the network interface 30.

The server memory 34 also contains server state variables 38, which contain the status information necessary to fully implement the Communication Protocol. The types of server state variables 38 stored in the preferred embodiment of the present invention are shown in Table 1.

These variable types represent a variety of data structures, and are used in various ways to control the workings of the server 20 and to facilitate communication between the client 18 and the server 20. To clarify the purpose of these variables, they are discussed below in detail.

The Client Connections list maintains a list of clients 18 that currently have a connection with the server 20 open under the Communication Protocol. In the preferred embodiment, the server 20 can support eight or more simultaneous client connections.

The Message Build Interval controls the polling interval to determine how often the server 20 internally polls its state to determine whether information needs to be constructed according to the Communication Protocol and transmitted to the client 18. In the preferred embodiment, this polling takes place approximately fifty times per second. This results in a worst case delay time of twenty milliseconds, with an average of ten milliseconds. This is adequate for users at terminals, and for most sliding window protocols.

By transmitting information only at the message build interval, the server 20 is able to accumulate information during the interval. Thus, data is sent in larger packets than if data were sent a character at a time, which limits the demands on both the network 10 and the client 18.

The Port Open State variable is a data structure which tracks which clients 18 have a connection open to a port 40, and which clients 18 are waiting to open that port 40. In other words, for each open port 40 this data structure tracks which client 18 currently holds the port 40 and which clients 18 are on the Open wait list. Further details on opening a port 40 are set forth below.

The Port Baud Rate variable stores the baud rate of each port 40 in such a way that the baud rate of the port 40 is 1,843,200 divided by the Port Baud Rate variable. This representation requires only sixteen bits to represent all standard baud rates in the range 50–115 K Baud.

The Processing Flags variables control, character size, hardware state, and input/output character processing for each port 40. There are four sets of processing flags that are stored in the server state variables: CFLAGS, IFLAGS, OFLAGS AND XFLAGS. CFLAGS, IFLAGS and OFLAGS are standard flags provided by in the termio interface of most standard UNIX operating systems, and are used in the present invention as is standard in the industry. (Unix Programmers Manual, Termio).

CFLAGS has settings which control UART hardware settings on the port 40, including character size, stop bits, and parity. The actual CFLAGS settings that it makes sense to implement in the server 20 include CBAUD, CSIZE, CSTOPB, CREAD, PARENB, PARODD, and HUPCL. Similarly, IFLAGS has settings which control the processing of data at the server 20 received from the port 40. IFLAGS settings include control over the interpretation of Break conditions, error handling and software flow control settings. The IFLAGS implemented on the server 20 are IGNBRK, IGNPAR, PARMRK, INPCK, ISTRIP, IXON, IXOFF, IXANY, DOSMODE. OFLAGS controls the server 20 processing of data intended to be outputted over the ports 40. OFLAGS settings control such things as CR and NL settings and tab delay, and are defined by termio to include OPOST, OLCUC, ONLCR, OCRNL, ONOCR, ONLRET, OFILL, OFDEL, NLDLY, CRDLY, TABDLY, BSDLY, VTDLY, FFDLY.

In the preferred embodiment, various flags settings which are no longer used with modern communications equipment are not supported. These flags settings include OFILL, OFDEL, NLDLY, CRDLY, BSDLY, VTDLY and FFDLY, all from OFLAGS. Each of these settings could be supported with only slight modifications to the preferred embodiment, but the decision whether or not to support these setting is irrelevant to the present invention.

XFLAGS is a set of flags taken from termio LFLAGS, plus some additional functions. The XFLAGS settings are set forth in Table 2.

The XFLAGS variables (except for XCASE which is a UNIX line discipline or LFLAG variable) are extensions to the UNIX feature set either to expand the interface to multiple host operating systems or to provide value-added features. These XFLAGS settings interact with the settings of the CFLAGS, IFLAGS and OFLAGS settings. The details of the interactions are as follows.

If the XPAR setting of XFLAGS is reset or if the underlying hardware does not support mark/space parity, then the PARODD setting of CFLAGS selects odd parity if set and even parity if reset. Otherwise PARODD selects space parity if set and mark parity if reset.

If PARMRK of IFLAGS and XMODEM of XFLAGS are set, any change in one or more modem signals is encoded in the input stream as FF 80 MM, where MM is the updated modem signal value.

If XCASE of XFLAGS is set, certain non-alphabetic printing characters are converted to two-character equivalents on output according to UNIX specifications.

XTOSS of XFLAGS controls whether a character that resumes output during flowing control is ignored or not. When IXANY of IFLAGS is reset, output is restarted only when a matching XON or XXON character is received. However, when IXANY of IFLAGS is set, any received character resumes output. Thus, if XTOSS is set, the character that resumes output is discarded. If XTOSS is reset, any non-flow control character resuming output is placed in the data stream.

When XIXON of XFLAGS is set, an extra set of output flow control characters is enabled. Receipt of XXOFF stops output while XXON resumes it.

The Flow Control Characters variables determine what the flow control characters will be. Two sets of output flow control characters are supported and one set of input flow control characters is supported. In addition, a flow control escape character is supported to allow input of flow control characters without interpretation. The Flow Control Characters include 1) the standard software flow control start character (XON), 2) the standard software flow control stop character (XOFF), 3) the extra software flow control start character (XXON), 4) the extra software flow control stop character (XXOFF) and 5) the flow Control Escape Character (LNEXT).

After receipt of the LNEXT character, the next character received is not recognized as a flow control character, and both characters are placed into the input data stream.

Returning to the Server State Variables 38, the provision of full modem control facilities to the client 18 are provided through eight Modem Control variables. Each of these variables use masks to represent the operating state of a modem. The seven modem variables are set forth as follows in Table 3.

All variables shown in Table 3 represent sets of modem signals, using the bit assignments shown in Table 4.

The use of the different Modem Control variables are as follows. The MOUT Modem Control Variable contains the values of RTS and DTR last requested by the client 18. These values are changed by issuing a request to the server 20. When the RTS/DTR bits in MFLOW are set, the corresponding values set in MOUT are temporarily ignored, and those signals indicate whether the server 20 is ready to receive data. When receive is paused, these signals are driven low. When receive is restarted, the signals are driven high.

MFLOW is used to inhibit the "in-band" output of data. Data, commands, and responses that are handled in the same sequence as the normal flow of data in and out of data ports is called in-band data. Data, commands, and responses that are transmitted ahead of normal data, and are processed immediately upon receipt are called out-of-band data. In-band output is inhibited when any of CTS/DSR/DCD/RI are set in MFLOW and at least one of the corresponding hardware input signals is low.

Flow control characters and transmit immediate characters are not governed by software flow control or MFLOW. They are transmitted according to the CTS/DSR/DCD/RI flow control constraints given by MCTRL. The server 20 automatically resets any bit in MCTRL that is not set in MFLOW.

MSTAT contains the current state of the input and output modem signals.

MLAST contains the last modem status reported to the client 18.

MTRAN contains the modem signals that have changed since they were last reported to the client 18. It is possible for MSTAT to equal MLAST and still have bits set in MTRAN. This condition indicates that some signals in MSTAT made at least one transition, and then returned to the value last reported to the client 18.

When any of the six modem signals are set in MINT, corresponding changes in those modem signals are reported to the client 18.

The server 20 of the present invention maintains per-port statistical counters in the server state variables 38 to keep track of the number of receive character errors occurring on that port 40. These counters are referred to as the Line Error Counters. A different counter is utilized to track each of the following counts: the number of UART overrun errors, the number of buffer overflow errors, the number of framing errors, the number of parity errors and the number of breaks received. Each of these variables are 16-bit wrap-around counters that keep track of the number of line errors that have occurred in each category for that port 40.

An additional Line Error Counter variable tracks the report time in milliseconds. If this variable is zero, line errors are not automatically reported to the client 18. Otherwise the server 20 inspects the counters at each specified interval, and sends a complete report to the client 18 if any have changed since the last report.

The Send Break and Send Immediate variables allow a client 18 to request the server 20 to immediately send either a Break or another character to a port 40. The Send Immediate variable is a one character buffer which contains the character that the client 18 wishes to send. The Send Break variable contains the length in milliseconds of the requested break. Two special cases exist in the contents of the Send Break variables. When an FFFF value is sent to Send Break, this denotes an infinite break time. A 0000 sent to Send Break cancels any break in progress. Any other value sent to the server 20 is simply added to Send Break time, and the break proceeds for the combined duration of the two requests.

Since the current invention does not utilize TCP/IP flow control for port flow control, data received by the client 18 or server 20 can always be immediately processed. As a result, it is easy to send out-of-band commands and data without disrupting the flow of in-band data.

The server 20 also maintains a list of status conditions in the Server State Variables 38. These status conditions are stored in the Event Reporting variables, and represent conditions that are of general interest to the client 18. The client 18 can poll these, or request that the server 20 automatically send the appropriate event information whenever the conditions change. The Event Reporting variables allow the server 20 to track the sending of this event information. Table 5 sets forth the various Event Reporting variables.

EINT can be set by the client 18 to create a predetermined condition which will cause event information to be sent by the server 20 to the client 18. Event information is sent to the client 18 whenever (ETRAN & EINT) is non-zero.

Note that it is possible for ESTAT to equal ELAST and still have bits set in ETRAN. This condition indicates that some conditions in ESTAT made at least one transition, and then returned to their ELAST values before they could be reported to the client 18.

The events that are recorded in these variables are set forth in Table 6, along with the masks which show how the events are indicated. The events listed in Table 6 are communication events well understood in the context of this invention.

The last two types of variables stored in the server state variables 38 are the Input Sequence and Receive Buffer Parameters variables and the related Output Sequence and Transmit Buffer Parameters. These variables represent the state of the transmit buffers 42 and the receive buffers 44 which are associated with each port 40.

To communicate the flow of data in the buffers 42, 44, the preferred embodiment of the server 20 uses sixteen bit wrap-around sequence numbers. Two sequence numbers are associated with each buffer 42, 44. The first sequence number communicates the sequence number of the next byte to be placed into the buffer. This first sequence number is labeled RIN for the receive buffer 44 and TIN for the transmit buffer 42. The second sequence number communicates the sequence number of the next byte to be removed from the buffer. This second sequence number is labeled ROUT for the receive buffer 44 and TOUT for the transmit buffer 42. These sequence numbers begin at zero and advance by one for each byte of data transmitted or received. When the sequence numbers reach FFFF, they wrap back to zero and continue when the next byte of data is transmitted or received. It should be noted that the TIN, TOUT, RIN, and ROUT variables are sequence number variables used to communicate between the client 18 and the server 20. They do not specify the physical positions of data in the transmit and receive buffers 42, 44, which is done through techniques well known in the art and not described herein.

These sequence numbers, and the other variables which make up the Input Sequence and Receive Buffer Parameters and the Output Sequence and Transmit Buffer Parameters variable types are shown in Tables 7 and 8.

Wrap-around sequence numbers like TIN, TOUT, RIN and ROUT have some very helpful mathematical properties. However, sequence numbers can be confusing, especially when doing addition and subtraction, since special definitions of these functions must be used as a result of their wrap-around nature.

Figure 4:
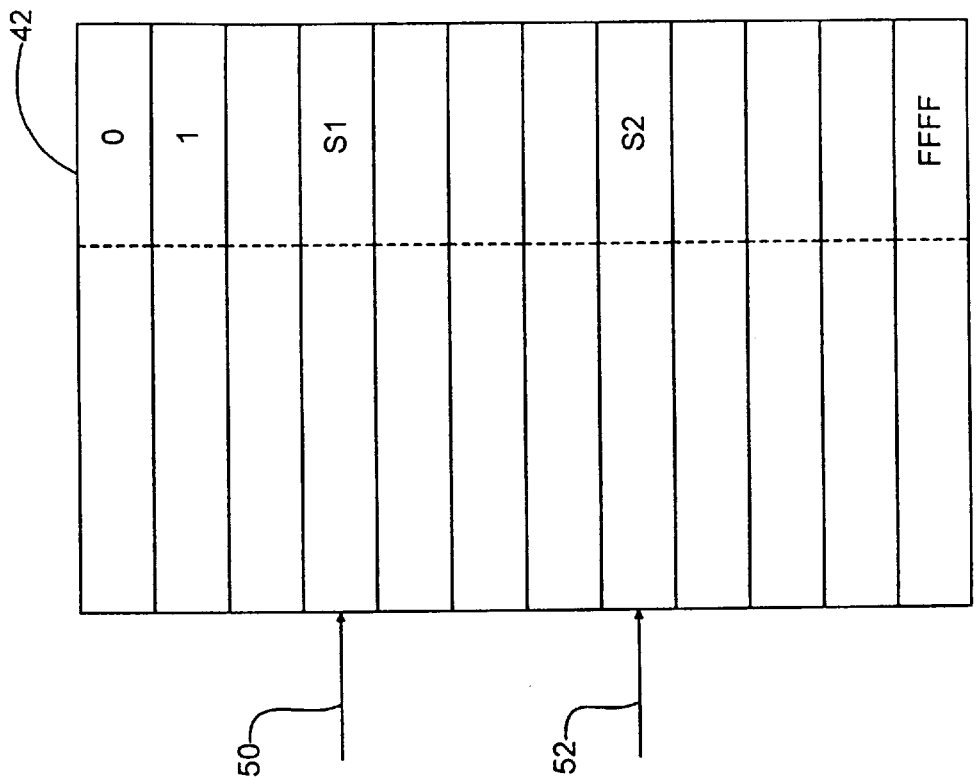
FIG. 4 illustrates a wrap-around sequence space with two sequence numbers pointing toward locations in the sequence space.
Figure 3:
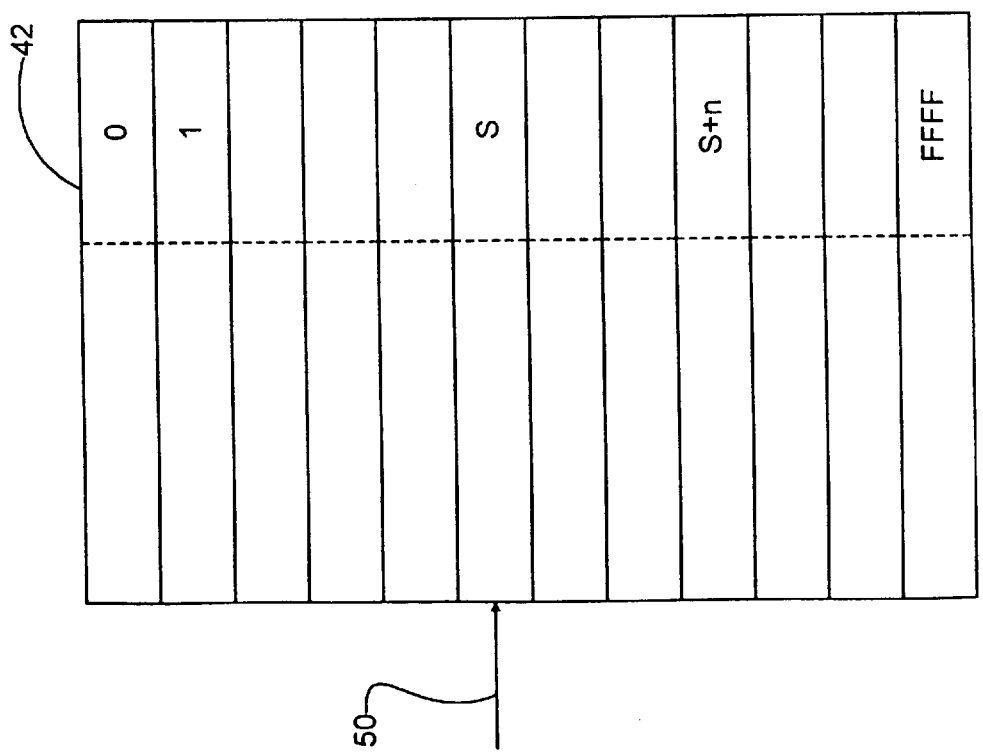
FIG. 3 illustrates a wrap-around sequence space with a single sequence number pointing toward a location in the sequence space.

To clarify their use, an example embodiment of a transmit buffer 42 will be discussed, as illustrated in FIGS. 3 and 4. In the embodiment of FIG. 3, the TOUT sequence pointer (pointing to the next byte of data to be transmitted out of the buffer 42 to a port 40 and represented in FIG. 3 by arrow 50) is set to byte S. When n bytes of data are transmitted, the transmitted bytes are numbered S though S+(n−1). By convention, we say the buffer has transmitted bytes between S and (S+n). However, since we are adding an ordinary number to a sequence number that wraps at 0xFFFF, we must compute the expression S+n using the following formula:

$$(S+n) \ \& \ 0xFFFF$$

with & indicating a logical AND operation. Thus, where S is 0xFFF8 and n is 5, the formula for computing S+n give us 0xFFFC. Similarly, where S is 0xFFF8 and n is 9, S+n is 2.

After transmitting n bytes, the TOUT sequence pointer must be advanced to the new location of the next byte to be transmitted. This is done by replacing the old value of TOUT with the computed result S+n.

To determine the number of bytes that exist between two sequence number, subtraction is used. However, a special rule must be used to determine the result of the subtraction of one sequence number from another. Thus, to determine the number of bytes between sequence number s1 and s2, the following formula is used:

$$(s2-s1) \ \& \ 0xffff$$

This formula works even if sequence s1 is numerically greater than sequence number s2. For example, if s1=0xFFF0 and s2=3, then (s2−s1) & 0xFFFF is 0x13, the correct answer.

In fact the concept of distance between sequence numbers is so important that it is useful to define it as:

$$DIST(from, to) = (((to)-(from)) \ \& \ 0xffff)$$

Given a pair of sequence numbers s1 and s2, it is true that s3 is the sequence location of a byte between s1 and s2 only if:

DIST(s1, s3)<DIST(s1, s2)

This formula can be read as: "s3 is between s1 and s2 if and only if the distance from s1 to s3 is less than the distance from s1 to s2."

Sequence numbers can communicate the amount of data, or the amount of free space in a remote buffer. Assume that in the transmit buffer 42 for a particular port 40, as shown in FIG. 4, the TOUT sequence number 50 is set to s1, while the TIN sequence number 52, representing the next byte to be transmitted through the port 40, is set to S2. In FIG. 4, both TOUT and TIN are represented by arrows pointing to locations in transmit buffer 42. It is possible to determine that the number of bytes in the transmit buffer 42 for that port is:

DIST(s1, s2)

In addition, if the transmit buffer 42 for that port is of fixed size SIZE, it is clear that the number of free bytes in the buffer is:

SIZE−DIST(s1, s2)

Both the client 18 and the server 20 of the present invention make use of the special characteristics of the wrap-around sequence numbers to control the in-band flow of information between them. Both client 18 and server 20 send in-band data to the other only when pre-authorized to do so. This pre-authorization is accomplished by communicating the amount of data that the other is allowed to transmit to it. When the sender has sent enough data to fill this space, the sender pauses in transmission until the receiver removes some of the data and informs the sender that additional space is available.

To control the flow from client 18 to server 20, the server 20 provides the client 18 with the size of its transmit buffer 42, and the sequence of the first byte currently in the transmit buffer 42 (TOUT). The client 18 keeps track of the data that has previously been sent to the server 20 by keeping its own client 18 send sequence number. By using this send sequence number, along with the information provided by the server 20, the client 18 can compute the amount empty space left in the server's transmit buffer 42. The client 18 therefore will not send any more data than will fit in that empty space.

Figure 5:
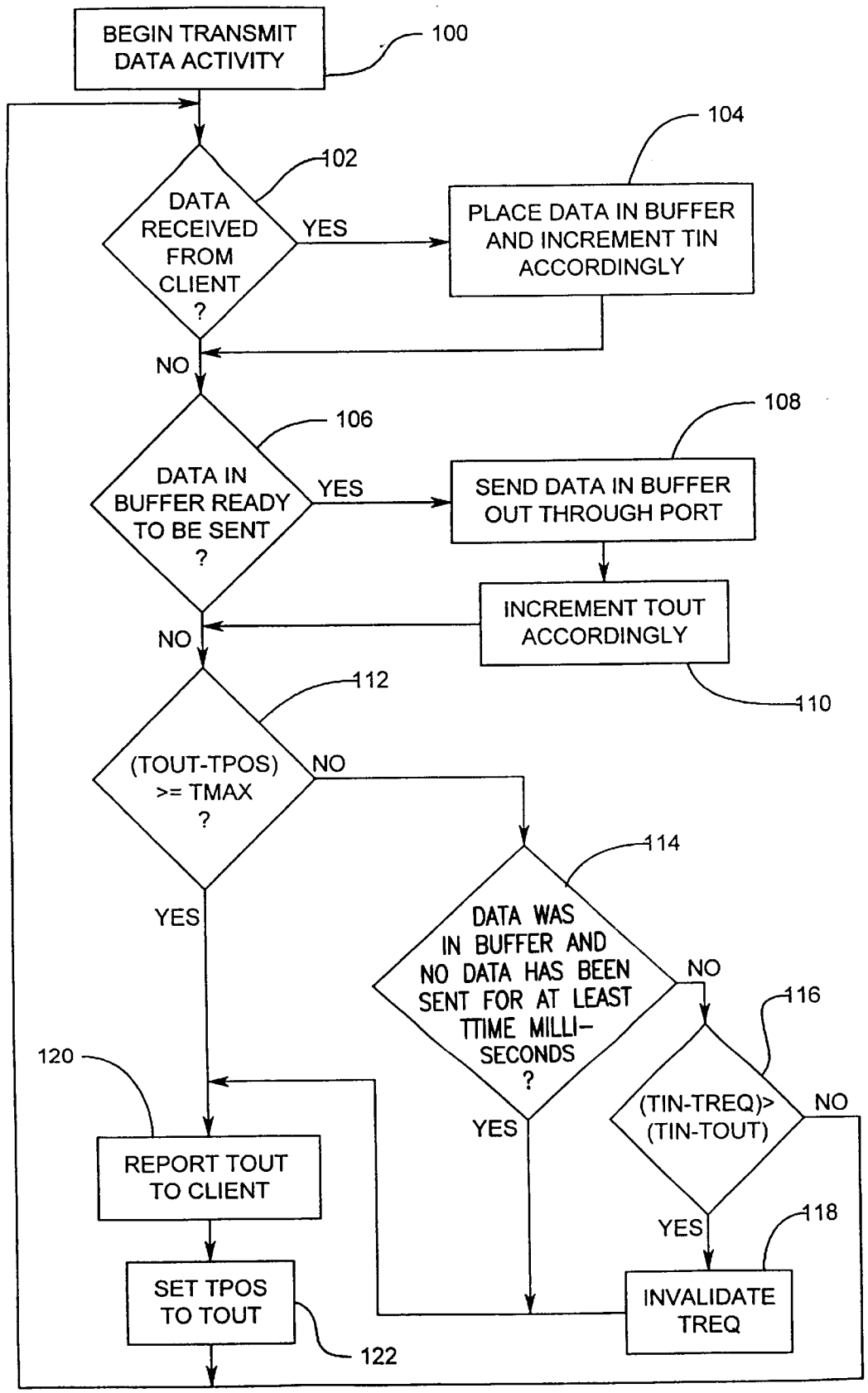
FIG. 5 illustrates the process by which a server controls the flow of data transmitted from a client through a server to a port.

This process is shown in detail by the flow chart of FIG. 5. The indication to start transmitting activity is shown in box 100 on the chart. The first step is to determine whether data has been received from the client 18 through the network interface 30 of the server 20. If so, as indicated in box 102, it is necessary to receive the data and place the data into the transmit buffer 42 for the appropriate port 40. Whenever data is placed in the transmit buffer 42, TIN is incremented, as is shown in box 104.

Whether or not data was received from the client 18, it is possible that data exists in the transmit buffer 42 that can be sent out through the port 40, as shown at query box 106. If data does exist, the data in the buffer 42 should be sent out over the port 40, box 108, and TOUT should be incremented, box 110.

At this point, the server 20 must determine whether it is necessary to report TOUT to the client 18. Three tests, indicated by query boxes 112, 114 and 116, are utilized in the preferred embodiment. The first test 112 compares TOUT, which indicates the next output byte to be transmitted, with TPOS. TPOS is one of the Output Sequence and Transmit Buffer Parameter variable stored in the server state variables 38. TPOS indicates the last value of TOUT that was reported to the client 18. If the difference between TOUT and TMAX, computed using the sequence number subtraction formula described above, is greater that TMAX, the TOUT will be reported. TMAX is also stored in the server state variables 38, and is set by the client 18 to determine the transmission intervals at which TOUT will be reported. Note that whenever TOUT is reported to the client 18, at box 120, TPOS is then set to the value of TOUT at box 122.

The second test for reporting TOUT, at Box 114, determines whether the data was in the buffer 42 at least TTIME milliseconds ago, and since that time TOUT has not been reported, with TTIME being a server state variable 38 which can be set by the client 18. If so, TOUT will be reported to client 18.

The final test, 116, compares the value of TOUT with the value of TREQ. TREQ, stored as one of the server state variables 38, is set by the client 18 so that when TOUT passes TREQ, TOUT is reported to the client 18. Mathematically, to compare the wrap-around sequence number TOUT with TREQ, it is necessary to test their relationship by comparing whether (TIN−TREQ) is greater than or equal to (TIN−TOUT), using the sequence number subtraction formula described above. If TOUT has passed TREQ, then TREQ becomes invalidated, box 118, and TOUT is reported to the client 18, box 120.

Figure 6:
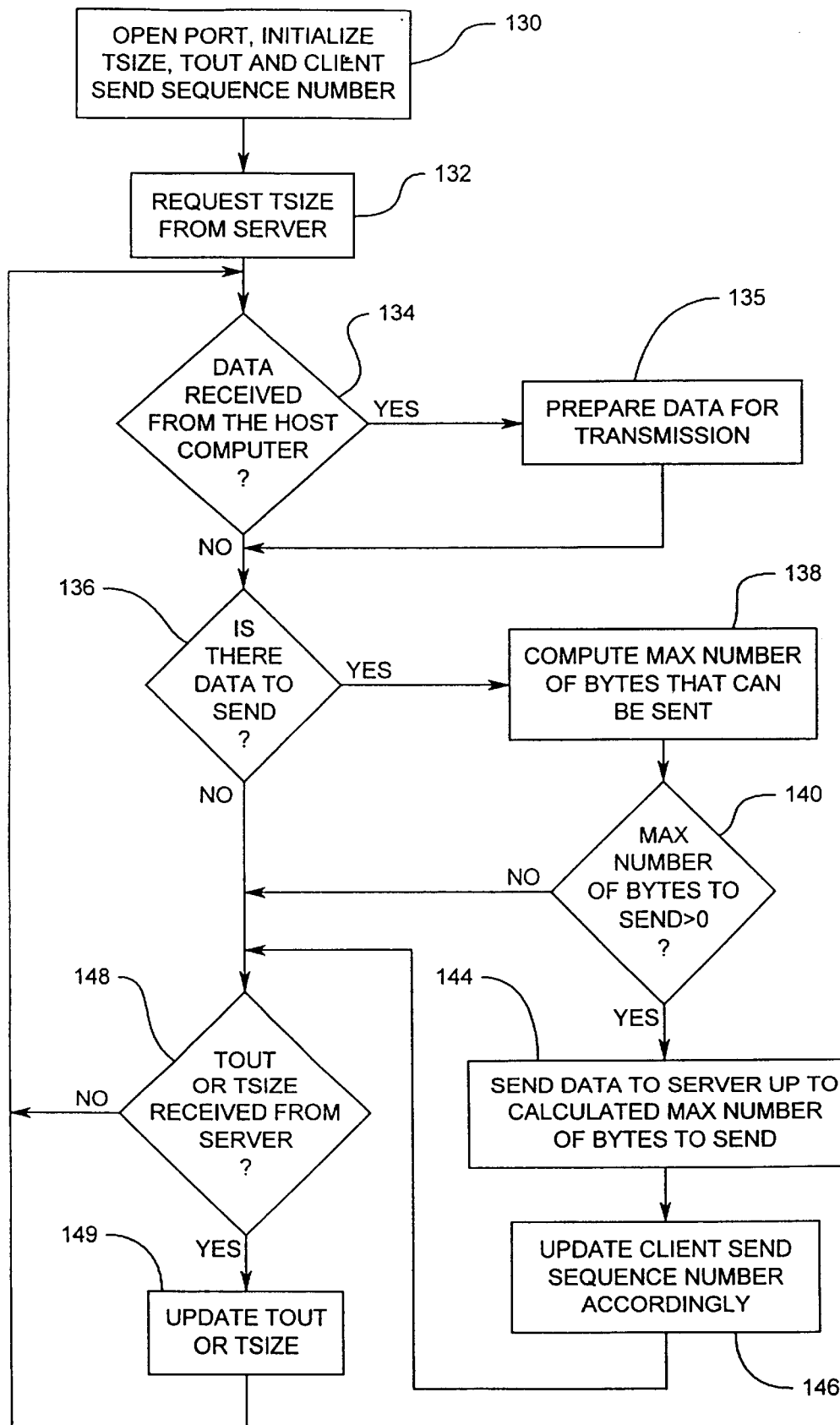
FIG. 6 illustrates the process by which a client controls the flow of data transmitted from a client through a server to a port.

To allow for flexibility in the client 18 driver software, the client 18 may send data to the server 20 whenever it is convenient to do so, so long as the client 18 does not overflow the server's transmit buffer 42. The procedure for making sure that the transmit buffer 42 does not overflow is shown in FIG. 6.

When a client 18 wishes to transmit data to a port 40, the driver on the client 18, which is handling the Communication Protocol for the client 18, must request that the server 20 open the port 40 for it, as shown in box 130. The details of opening a port 40 are explained below. After a successful open, the client 18 assumes that TSIZE, the size of the transmit buffer 42 connected to the open port 40, and TOUT are zero. In addition, the client 18 resets its own Send Sequence Number, which is a wrap around sequence number variable stored and maintained on the client 18. The client 18 then requests TSIZE from the server as shown in box 132. Note that the client cannot actually send data, as shown in box 140, until TSIZE is received from the server 20 as explained below.

The client 18 next determines if data has been received from the host computer, at box 134. If data has been received, the data must be prepared for transmission, box 135. The preparation for transmission is later discussed in detail.

The client 18 then tests if there is any data to be sent at box 136. If data is ready to be sent, the client's driver must compute the maximum number of bytes that can be accepted by the server 20 without overflowing the transmit buffer 42, box 138. This is accomplished by comparing the client's Send Sequence Number with the most recently reported value of TOUT, and subtracting this difference from TSIZE:

Max # Bytes to Send=TSIZE−(Send Sequence #−TOUT))

Of course, the subtraction of the sequence number TOUT from the client's Send Sequence Number must be done in compliance with the formula for subtracting sequence numbers.

If the calculated maximum number of bytes to be sent is greater than zero, box 140, then up to that number of bytes can be sent to the server 20, as shown in box 144. The client's Send Sequence Number must then be incremented by the number of bytes sent, box 146.

Regardless of whether data has been sent, the client 18 must next determine whether the server 20 has transmitted the value for TOUT or TSIZE, as shown in box 148. If so, the value of TOUT or TSIZE as stored at the client 18 is updated, box 149.

To avoid falsely reporting that the transmitter is idle when it is not, the server 20 recognizes a very special case. When the transmit buffer 42 is empty, but the UART is still busy sending in-band data, the server 20 reports (TOUT−1) instead of TOUT. This convention allows the client 18 to assume all data has been successfully sent when the client receives TOUT equal to the Send Sequence Number of the last data sent to the server 20.

Figure 7:
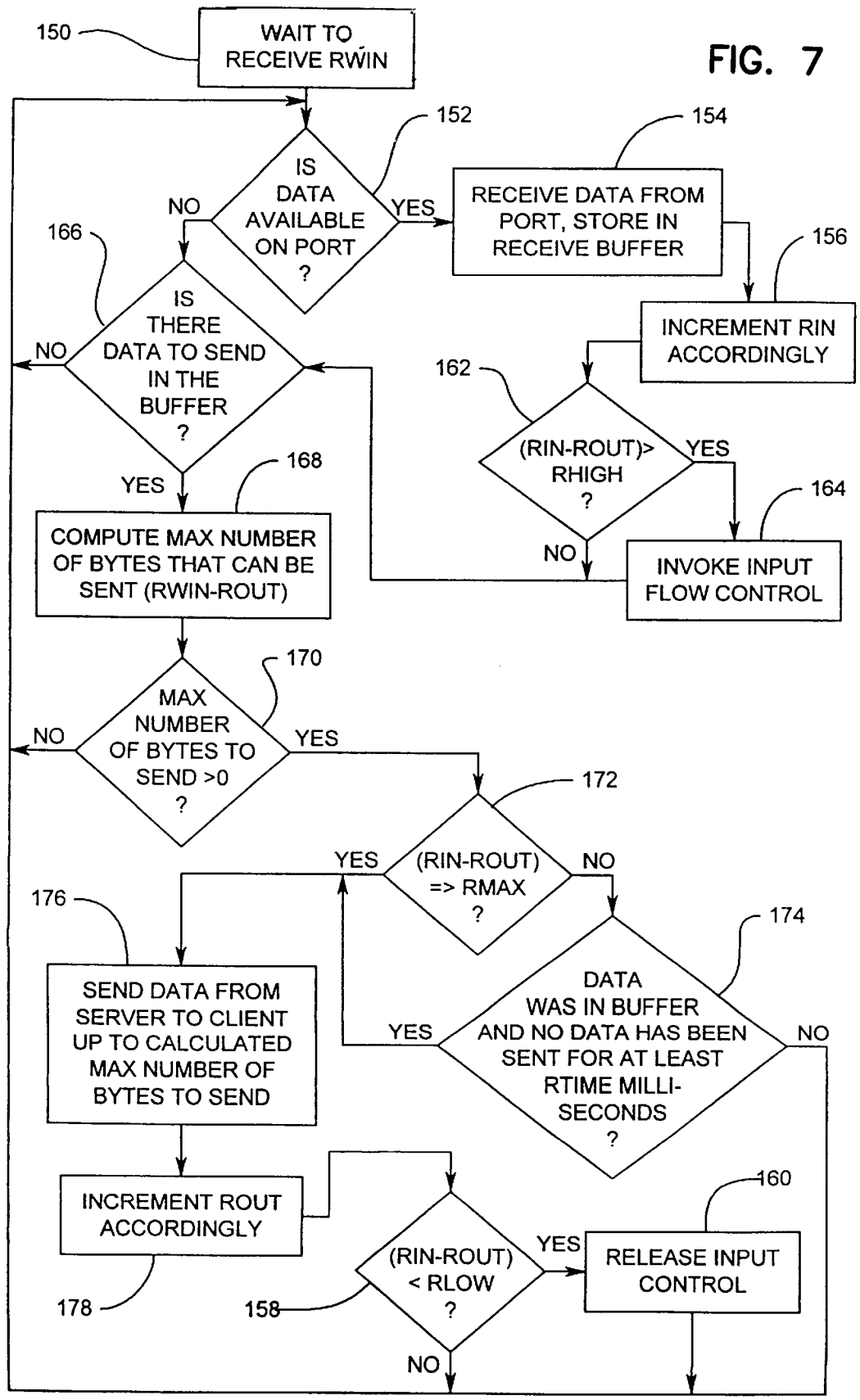
FIG. 7 illustrates the process by which a server controls the flow of data transmitted from a port through a server to a client.

The handling of data received from the port 40 and transmitted from the server 20 to the client 18 is shown in FIG. 7. The server 20 is not authorized to transmit data to the client 18 until the server 20 receives a value for RWIN, as seen in box 150. RWIN is an Input Sequence and Receive Buffer variable which is set by the client 18 to indicate the highest sequence number the client 18 wishes to accept.

When the initial RWIN is received from the client 18, the server 20 examines the port 40 to see if incoming data is available to be placed into the receive buffer 44, shown at box 152. If data has been received, it is placed in the receive buffer 44 and the RIN sequence number is incremented accordingly. This is shown in box 154 and box 156.

Because it is not known by the server 20 how quickly the client 18 will be able to receive data from the server 20, the server 20 has the ability to implement input flow control on the port 40. Flow control is initiated when the amount of data remaining in the receive buffer 44 (calculated as RIN−ROUT) exceeds the value of RHIGH, another Input Sequence and Receive Buffer. Thus, after data has been placed in the receive buffer 44 and RIN has been incremented, the server 20 determines whether input control shall be invoked, boxes 162 and 164. Flow control is released when the amount of data in the receive buffer 44 drops below Input Sequence and Receive Buffer RLOW, which is tested after data is sent to the client 18 as shown in boxes 158 and 160.

If the review of the port 40 in step 152 did not find new data on the port 40, the server 20 then determines whether data is available to be sent in the receive buffer 44. If not, as indicated in FIG. 7 at box 166, the server 20 again waits for data at the port 40.

If data is available on the receive buffer 44, then the server 20 must compute the maximum number of bytes that can be sent to the client 18, at box 168. The number is determined by the simple formula (RWIN−ROUT), calculated according to the sequence number subtraction formula. If the maximum number of bytes to send is zero, then the server 20 must wait for RWIN to be updated, shown as at query box 170. If the calculated number is greater than zero, then the server 20 must determine whether it is appropriate to send the data bytes to the client 18 at this time. Two tests are used to trigger the sending of data. The first test, at box 172, compares the number of bytes in the receive buffer 44 (RIN−ROUT) with RMAX, an Input Sequence and Receive Buffer which can be set by the client 18. If the bytes in the receive buffer 44 exceeds RMAX, then up to the maximum number of bytes allowed is sent to the client 18, box 176, and ROUT is incremented accordingly, box 178.

If the number of bytes in the receive buffer 44 did not exceed RMAX, then the server 20 determines if data has been in the receive buffer 44 at least RTIME milliseconds ago and since that time data has not been sent to the client 18. If so, then, as shown in query box 174, data is sent to the client 18.

If data is not sent to the client 18, the data remains in the receive buffer 44 until one of the two conditions for sending data, 172 or 174, becomes true.

After a port 40 is opened, RMAX is initialized to one, RTIME to zero, RLOW to ¼ RSIZE, RHIGH to ¾ RSIZE and all the sequence numbers are zeroed. These variables however can be altered as desired.

Generally, the server 20 sends all available data for each port 40 when it sends any data for that port 40, unless it is restricted by the calculated maximum number of bytes that can be sent. This convention reduces the number of packets both server 20 and client 18 must process, and generally improves client 18 efficiency.

Figure 8:
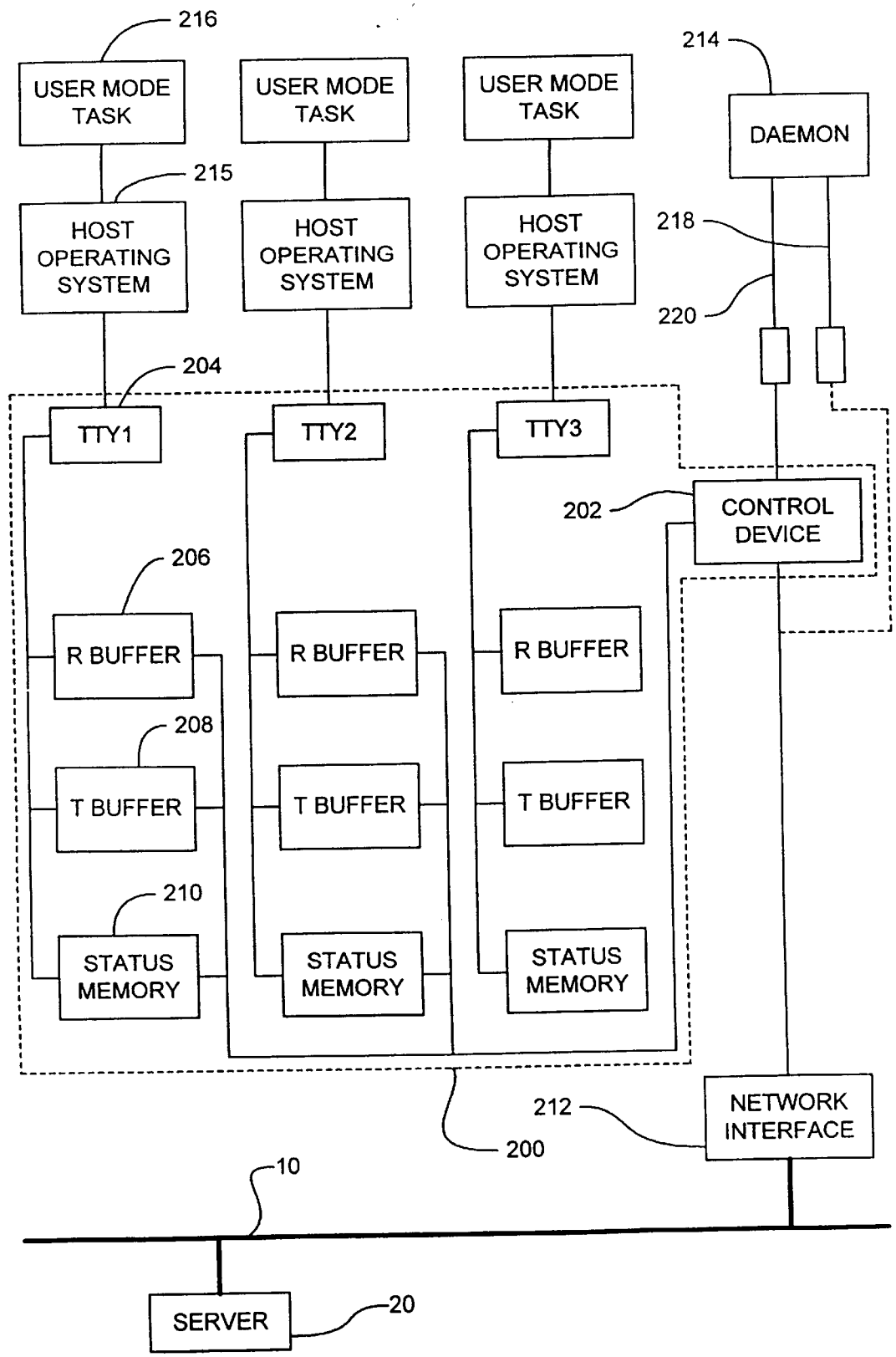
FIG. 8 illustrates a client computer attached across a general purpose network to a server of the present invention, including the critical components of the client driver.

On the client side, in the host computer, the operation of the invention can vary greatly depending upon the operating system of the host computer. For the purposes of describing the operation of present invention on a client 18, the implementation on a UNIX host system will be outlined, as shown in FIG. 8. The invention provides access to the ports 40 on the server 20 through the use of a client driver 200 which implements the API of the host operating system by emulating a driver for a set of locally connected serial ports 204. To do this, the client driver 200 maintains for each remote server port 204, an input or receive buffer 206, an output or transmit buffer 208, and information concerning the state of the remote server 20 as well as the interface to the host computer, which are stored in status memory 210.

The driver 200 also interfaces to a standard network interface 212 which is connected to the general purpose network 10. All communication from the client driver 200 to the server 20 is transmitted over the network 10. The network interface 212 maintains only one connection over the network 10 for each server 20, regardless of the number of ports 40 that the driver 200 has open under the Communication Protocol.

When the system is booted, the operating system start-up procedure initializes the driver 200, and for each server 20 starts up a user mode daemon 214 which opens a STREAMS connection 218 to the server 20. The daemon 214 then opens a STREAMS connection 220 to a control device 202 associated with the driver 200. The Daemon 214 next, using the STREAMS interface, requests that the operating system link the stream 218 below the control device 202 so that the driver 200 can directly send and receive data on the network connection to the server 20 w/o further interaction from the daemon 214. By doing so, the driver 200 is able to both transmit TCP/IP data to and receive TCP/IP data from the server 20 in the STREAMS queue service routine of the control device. This eliminates the task switch overhead required by the prior art.

The connection made is a bytestream connection, allowing the driver 200 to reliably send and received sequenced data to the server 20. The driver 200 relies completely upon the reliability of this connection and has no provision to retry for lost packets and the like. Should the driver 200 ever detect an error in the data received from the server 20, the driver 200 passes a hangup signal up to the daemon 214, which then closes and attempts to reopen the connection to the server 20. Such an error cannot occur during normal operation. The error can only occur due to a failure of the remote server software, the networking software, the driver software, or some sort of computer failure. The standard TCP/IP software in the host computer effectively insures this sort of error cannot occur due to lost or garbled packets as normally happens on a general purpose computer network 10.

Once the driver 200 has access to the network connection, the driver requests the server 20 to return information as to the number of serial ports 40 on the server 20, and other hardware and software characteristics of the server 20.

When a user mode task 216 attempts to open a TTY serial port 204, the host operating system 215 makes an open call to the driver 200. If the port 204 is not already open by another user mode task 216, the driver sends an open request to the server 20 to gain exclusive access to the port 40 on the server 20 associated with the TTY port 204 of the driver 200. If the port 40 is available, the server 20 responds, granting exclusive access to the client 18 until the client 18 closes the port 40, or the connection to the client 18 is lost.

If the port 40 is not available, the action taken depends on the type of open request originally made by the user mode task 216. A user mode task 216 may request that the open fail if it cannot be done immediately, or it may request that the request wait until the port 40 becomes available. In the former case, the driver 200 requests an immediate open to the server 20, which the server 20 rejects if the port 40 is busy, and the driver 200 then returns an error to the user mode task 216. In the latter case, the driver 200 issues a waiting open to the server 20, asking to be put on a queue of waiting clients until the port 40 eventually becomes available. The server 20 then returns an indication that the request is queued, and the driver 200 puts the user mode task 216 to sleep until the server 20 notifies the driver 200 that the port 40 is available.

Once the driver 200 has successfully opened a server port 40, the driver 200 sends inquiry packets to the server 20 to learn the hardware and software characteristics of the port 40, including the hertz value of the baud rate generator, and whether the port 40 can support mark and space parity. The driver 200 also sends the server 20 the size of the receive buffer 206 for port 204 so that the server 20 knows how much data can be received by the client 18 without further authorization. The server 20 responds to the inquiries, sending the characteristics of the port 40, and including the size of transmit and receive buffers 42, 44 of the port 40.

When the driver 200 has received the reply from the server 20, the driver 200 is ready to send and receive data to the port 40, and make control and status inquiries on behalf of a user mode task 216, when requested to do so by the host operating system open/close/ioctl (input/output control) interface.

Thereafter, all data received on the port 40 of the server 20 is automatically sent to the client 18, where it is stored in a receive buffer 206. The server 20 is initially authorized to send as much input port data as will fit in this buffer 206, but no more, so there is no possibility of a buffer overrun.

When a user mode task 216 requests to read data, the host operating system calls the read routine of the driver 200. If sufficient data has been received from the server 20, according to the parameters of the read request, the driver 200 returns that data to the host operating system 215 which in turn passes the data to the user mode task 216. If sufficient data is not available, the driver 200 puts the user mode task 216 to sleep until the data arrives, or until the read request times out or is interrupted according to the API of the host operating system 215.

After the driver 200 has removed data from the receive buffer 206, the driver 200 informs the server 20 that this data has been removed by incrementing a sequence number (RWIN) by the number of bytes removed, as described above. The server 20 is then authorized to send additional data until that data reaches the sequence number RWIN.

When a user mode task 216 requests to write data, the host operating system 215 calls the write routine of the driver 200. If the driver 200 then copies as much of the user data as will fit into the transmit buffer 208. If all of the data could be placed in the transmit buffer 208, the server 20 completes the request, and the user mode task 216 is allowed to continue. If not all of the data fit in the transmit buffer 208, the driver 200 puts the user mode task 216 to sleep until data can be sent to the server 20, freeing up enough space in the transmit buffer 208 so the remaining data can be placed in the buffer 208.

When a user mode task 216 makes a control or inquiry request (known as an ioctl request), the host operating system 215 calls the ioctl routine in the driver 200. If the request is to change the hardware or software characteristics of the port 204, the driver 200 notes the change in the status memory 210, and sends a command to the server 20 to make the necessary changes. If the request is an inquiry request which the driver 200 can respond to without consulting the server 20, the driver 200 will do so. If the request requires data in the server 20, the driver 200 sends an inquiry request to the server 20 for this information and uses the information returned to satisfy the request of the user mode task 216. The types of requests that can be made by user mode tasks 216 are very diverse, and the action takes varies widely. In some cases the request can be satisfied immediately, and in some cases the user mode task 216 must be put to sleep until the request can be completed.

When a user mode task 216 makes the last close to the TTY port 204, the host operating system calls the close routine of the driver 200. This causes the driver 200 to put the user mode task 216 to sleep, to wait until all the data in the transmit buffer 208 has been transmitted and to wait until any pending request to the server 20 are complete. The driver 200 then sends a close request to the server 20. Upon receipt of the close request, the server 20 de-allocates the port 40 and possibly reallocates it to another client 18. The driver 200 then completes the close, and the user mode task 216 continues.

To optimize the efficiency of the operations of the driver 200, and minimize the load on the host operating system 215, driver 200 communications to the server 20 are made at periodic intervals about fifty times/second. At each such interval, the driver 200 inspects each active port 204 that is open to that server 20, and places requests and data for all such ports 204, 40 into a common message, and sends that message to the server 20 as a single operation. This action minimizes the total number of TCP/IP messages (or other general purpose network messages) that must be sent to the server 20, and so enhances the operation of the system.

It should be recognized that the current invention provides a protocol which can be used to simulate serial port hardware across a network 10. When used in this manner, a board or other hardware is installed in a host computer in such a way that it provides a serial port interface to the host computer similar to a local serial port board. In this embodiment, the board contains a general-purpose network protocol stack, in addition to other software that provides the serial port interface and the functionality described above in connection with the client driver 200. Using this board, drivers can be used on the host operating system that are aware of only a serial port interface, and are unaware of the existence of the network 10.

Such a hardware implementation has several advantages. First, it can be used to emulate a hardware or software interface for which drivers are already available (or can easily be adapted) on the host operating system. Second, the board can be installed in a computer where networking hardware or software is not readily available, thereby providing network services to the host computer. Third, the board can include an additional processor and hardware which off-loads much of the serial port overhead onto the card. Finally, such a card could be multi-functional in nature by containing, for example, a small number of physical devices that could either be reserved for the local computer or be network accessible.

All information, including data and commands, exchanged between the server 20 and the client 18 is sent over the byte stream provided by the network protocol in small units called packets. The format of these packets makes up the Communication Protocol of the present invention. The Communication Protocol packets are similar in format to CRT terminal escape sequences, in that the first few bytes of the sequence determine the format and length of the data that follows.

The creation of the packets for communication from the server 20 to the client 18 takes place in the CPU 32 of the server 20. Packets that are sent from the client 18 to the server 20 are created by the special driver operating on the client 18. The packets themselves have a variable format and variable length, depending on the type of information they contain. The format of each packet is determined by processing it sequentially. The value of earlier bytes completely determines the format and content of the bytes that follow.

Table 9 shows the different types of packets which can be sent between a server 20 and a client 18. The table shows how the first byte breaks down a packet into major subtypes. Values denoted illegal were not supported in the preferred embodiment of the present invention.

Data packets are used to send all in-band data between the client 18 and server 20. When received by the server 20, the data in the data packets are transmitted through to the appropriate port 40 as described above.

Window sequence packets inform the receiver about the state of the sender's sequence numbers. The transfer of this information is essential for the working of the data flow control of the present invention, as outlined above. Window sequence packets are used by the server 20 to send TOUT to the client 18, and are used by the client 18 to send RWIN to the server 20.

Command packets have different formats and different lengths depending on the value of the command type field in byte one. Commands are sent to set and to query about the values of the server state variables 38. In addition, command packets are utilized to open a port 40, allowing the client 18 to guarantee synchronization with the server 20, to ascertain the size of the server transmit and receive buffers 42, 44, to ascertain the capabilities of a particular port 40, to flush the buffers 42, 44 of the server 20, to send a break or an immediate character and to pause or restart input or output. The command packets implemented in the preferred embodiment are set forth in Table 10.

Two of the most important command packets involve communication between the client 18 and the server 20 in connection with opening a port 40. The Open Request command for opening a port 40 is sent by a client 18 who wishes to obtain exclusive access to a port 40 on a server 20. When the server 20 receives an Open Request command, the server 20 attempts to open the port 40 for the client 18 and then responds with an Open Response packet which informs the client 18 of the results of the open attempt.

The format of the Open Request Command Packet and the Open Response Command Packet are set forth in Tables 11 and 12.

The command packet to open a port 40 can take different forms, depending on which type of open command is desired by the requesting client 18. The possible types of open commands are an immediate open, a persistent open, an incoming open.

A request for an immediate open succeeds and the port 40 is assigned to the requesting client 18 only if the port 40 is valid and immediately available. If the port 40 is not immediately available, the request fails.

When a persistent open request is made, the request will succeed and the port 40 will be assigned to the client 18 if the port 40 is available. If the port 40 is busy, the server 20 returns an Open Response packet to the client 18 which indicates the port 40 is busy, and then places the client 18 on a waiting list for that port 40. When the port 40 subsequently becomes available, the port 40 is opened, and the client 18 is notified with a second Open Response indicating success.

The third type of open request is a request for an incoming open. This request succeeds immediately if the port 40 is available, and a carrier is present on the port 40. If the port 40 is busy, or if a carrier is not present, the server 20 returns the corresponding Open Response code and places the client 18 on a waiting list for that port 40. When the port 40 subsequently becomes available with carrier present, the port 40 is opened, and the client 18 is notified with a second Open Response indicating success.

A client 18 may also send a cancel waiting type of Open Request for a particular port 40. When this command is received from a client 18, the server 20 checks to see if the client 18 is on the waiting list for that port 40. If the client 18 is found on the list, the client 18 is removed, and the server 20 returns an Open Response indicating success.

It is possible to organize ports 40 on a server 20 into a port hunt group. When this is done, the server 20 provides one or more logical ports designated as hunt group ports so that any attempt to open one of these ports in fact opens a physical port 40 configured as a member of the hunt group. Thus, if a client 18 requests a port 40 which is part of a port hunt group, the actual port 40 opened will be different from the port 40 requested. The client 18 must inspect the PNUM portion of the Open Response after a successful open, and use that port number for all subsequent references to the port 40.

The Synchronization Request command causes the recipient to respond with a Synchronization Response. It has no other effect. The primary purpose of this command is to allow the client to guarantee synchronization with the server. For example, a client 18 may wish to confirm a requested baud rate change before returning to the calling program. The client 18 achieves this by first sending a baud rate change to the server 20, and then following it with a Synchronization Request. Since the server 20 processes commands sequentially, when the client 18 receives the matching Synchronization Response, the client 18 can be confident the baud rate change has been accomplished.

The Sequence Request and Response Packets are provided so the client 18 can accurately track the flow of data in and out of the server 20. The server 20 responds to this packet by providing RIN and TOUT to the client 18.

The client 18 may send a Status Request Packet to discern the current state of ESTAT and MSTAT in the server 20. The server 20 returns the requested data in a Status Response Packet, and takes no other action. This command is one of two ways the client 18 may learn the status of server 20. The client 18 may also use the Select Event Conditions Packet to have the server automatically report selected status changes as they occur.

The client 18 sends the Line Error Request Packet to poll the line error counters, to configure periodic reporting of line error counters, and to clear the counters. The server 20 sends a Line Error Response in response to a poll for the error counters, and also at periodic intervals as configured with the variable LTIME. All Line Error Request packets may set the server variable LTIME. An LTIME value of 0 disables automatic reporting. An LTIME value of FFFF leaves LTIME unchanged.

After the client 18 has set LTIME non-zero, the server 20 inspects the state of the error counters every LTIME milliseconds (to an accuracy of approximately 20 milliseconds) and sends an automatic Line Error Response packet if they have changed since the last report.

The Buffer Request Packet is sent by the client 18 to learn the size of the server transmit buffers 42 and receive buffers 44. The server 20 responds with the Buffer Response Packet. After a successful open, and before sending data to the server 20, the client 18 needs to ascertain the size of the server's buffers 42, 44. The size of the transmit buffer 42 is needed so the client 18 can know how much data the client 18 is allowed to send. The size of the receive buffer 44 is needed so the server 20 can set the flow control high and low water marks accordingly.

The Port capability request packet is generally sent by the client 18 to learn the capabilities of the hardware and software of a port 40. Unlike other port-level commands, the port 40 need not be open when this command is issued.

The Set Baud Rate command is used by the client 18 to set the port baud rate, CFLAGS, IFLAGS, OFLAGS and XFLAGS of a port 40.

The client 18 sends the Select Event Conditions command to specify which ESTAT and MSTAT conditions cause the server 20 to send an Event Packet. The client may also poll for ESTAT and MSTAT using the Status Request Packet.

The Set Window Trigger command allows the client 18 to set TREQ, one of the server status variable 38. TREQ is the client 18 requested level at which a Window Sequence Packet should be sent. If TREQ is outside the range of data currently in the output buffer, the server 20 immediately responds with a Window Sequence Packet.

The Set Modem Outputs and Flow Control packet is sent by the client 18 to set modem outputs, and select modem-signal hardware flow control. Note that when RTS and DTR modem flow control are selected, the values of RTS and DTR in MOUT are ignored.

The client 18 sends the Set Receive High/Low Water Marks packet to set receive flow control high and low water marks. When this packet is processed by the server 20, if takes effect immediately. If the number of characters in the input buffer exceeds RHIGH, flow control is immediately invoked. If less than RLOW, flow control is immediately released.

The client 18 sends the Set Flow Control Characters packet to set server 20 software flow control characters. Similarly, the client sends the Set RMAX and RTIME command to set the parameters RMAX and RTIME and the Set TMAX and TTIME command to set TMAX and TTIME.

The client sends the Send Character Immediate packet to send a character ahead of in-band data. In sending immediate data, software flow control is ignored, and hardware flow control uses the variable MCTRL instead of MFLOW. The client 18 utilizes the Send Break Immediate packet to send a hardware break signal. The Break signal is also sent ahead of all in-band data, and regardless of software or hardware flow control.

The client sends Flush Buffers packet to flush either or both the server input and output buffers. The Pause Input/Output packet pauses any set of software flow control conditions in the server. It is ineffective to attempt to pause input if the number of characters in the receive buffer is less than RLOW. Finally, the Unpause Input/Output packet is used to unpause any set of software flow control conditions in the server. It is ineffective to attempt to unpause input if the number of characters in the receive buffer is greater than RHIGH.

Event packets are sent by the server 20 to inform the client 18 of changes in ESTAT and MSTAT conditions. The server 20 sends an event packet for each port 40 whenever: (ETRAN & EINT) or (MTRAN & MINT) are non-zero.

To assure this request does not cause transitions to be lost that would otherwise be reported in event packets, the server 20 first sets ELAST and MLAST as follows, and then reports ELAST and MLAST to the client 18.

ELAST˜=(ESTAT˜ELAST)|(ETRAN & EINT)

ETRAN=ESTAT˜ELAST

MLAST˜=(MSTAT˜MLAST)|(MTRAN & MINT)

MTRAN=MSTAT˜MLAST

Module Select Packets are used to select a particular grouping of ports 40. To reduce communication bandwidth, ports 40 are logically grouped into modules, with each module containing only sixteen ports 40 (ports 0–15). There need be no relationship between a logical module grouping and the physical layout of the ports 40 on the server(s). By grouping ports 40 into modules, the addressing in all commands and responses references need to only refer to which port (0–15) is desired within the current module. Module 0 is selected by default. Modules 0–7 can be selected with a one byte module select packet. Modules 8–255 require a two-byte packet. It is possible to convert between a module and port pair and a physical port number. When module n is selected, port K in all subsequent packets refers to physical port 16 *n+K.

An ID request packet is sent by either the client 18 or server 20 to get identity or configuration information from the remote. The remote responds with a corresponding ID response packet.

The debugging packet types supports access to ports 40 of the server 20 for debugging purposes, such as transmitting debugging data between the client 18 and server 20. These packets could also be used to allow the client 18 access to the server program memory 36, either to review the contents of program memory 36 or to change the programming of the server 20 as stored in program memory 36.

The reset packet type is sent by a client 18 or server 20 to report a protocol error to the remote, prior to shutting down the connection. The packet contains an explanation of the reason for the reset in an ASCII format. The Reset Packet should be the last packet sent in a conversation.

Although this discussion has not specifically covered operating systems other than UNIX, it will be obvious to one skilled in the art that there are features documented in XFLAGS, the error counters and the event flags that are required to satisfy the application programming interfaces of Novell, Windows, Windows NT, OS/2 and DOS. As a result, the implementation of the invention in any of these operating systems is obvious to one skilled in the art.

The invention is not to be taken as limited to all of the details thereof as modifications and variations thereof may be made without departing from the spirit or scope of the invention.

TABLE 1

Server State Variables

| Type of Server State Variables | Frequency |
|---|---|
| Client Connections | per server |
| Message Build Interval | per server |
| Port Open State | per port |
| Port Baud Rate | per port |
| Processing Flags | per port |
| Flow Control Characters | per port |
| Modem Control | per port |
| Line Error Counters | per port |
| Send Break and Send Immediate | per port |
| Event Reporting | per port |
| Input Sequence and Receive Buffer Parameters | per port |
| Output Sequence and Transmit Buffer Parameters | per port |

TABLE 2

XFLAGS Settings

| Mask | Name | Description |
|---|---|---|
| 0001 | XPAR | Enable Mark/Space parity. |
| 0002 | XMODEM | Enable in-band modem signaling. |
| 0004 | XCASE | Convert special characters to multiple-character sequences on output. |
| 0040 | XTOSS | Toss IXANY characters. |
| 2000 | XIXON | Enable a second set of Output Software Flow Control Characters. |

TABLE 3

Modem Variables

| Name | Description |
|---|---|
| MOUT | Client specified modem output values. |
| MFLOW | Modem flow control for in-band data. |
| MCTRL | Modem flow control for out-of-band data. |
| MSTAT | Current modem status. |
| MLAST | Last modem status sent to the client. |
| MTRAN | Set of modem signals which have changed, but those changes have not yet been sent to the client. |
| MINT | Modem signal changes to be reported to the client. |

TABLE 4

Modem Signals in Modem Variables

| Mask | Name | Description |
|---|---|---|
| 01 | DTR | Data Terminal Ready. |
| 02 | RTS | Request To Send. |
| 10 | CTS | Clear to Send. |
| 20 | DSR | Data Set Ready. |
| 40 | RI | Ring Indicator. |
| 80 | DCD | Data Carrier Detect. |

TABLE 5

Event Reporting Variables

| Name | Description |
|---|---|
| ESTAT | Current state of event conditions. |
| ELAST | Last state of the event conditions sent to the client. |
| ETRAN | Set of event conditions which have seen transitions, but those transitions have not yet been reported to the client. |
| EINT | Set of event conditions which cause an event to be generated. |

TABLE 6

Recorded Events

| Mask | Name | Description |
|---|---|---|
| 0001 | OPU | Output paused unconditionally by client. |
| 0002 | OPS | Output paused by regular software flow control. |
| 0004 | OPX | Output paused by extra software flow control characters. |
| 0008 | OPH | Output paused by hardware flow control. |
| 0010 | IPU | Input paused unconditionally by client. |
| 0020 | IPS | Input paused by high/low water marks. |
| 0040 | TXB | Transmit break pending. |
| 0080 | TXI | Transmit immediate pending. |
| 0100 | TXF | Transmit flow control character pending. |
| 0200 | RXB | Break received. |

TABLE 7

Input Sequence and Receive Buffer Variables

| Name | Description |
|---|---|
| RIN | Sequence number of the next byte of data to be read from the UART and placed in the local receive buffer. |
| ROUT | Sequence number of the next byte to be transmitted from the receive buffer to the client. |
| RWIN | Highest Sequence number the client wishes to accept. |
| RMAX | Receive trigger maximum. |
| RTIME | Receive trigger time. |
| RSIZE | Size of the local receive buffer. |
| RLOW | Software flow control low water mark. |
| RHIGH | Software flow control high water mark. |

TABLE 8

Output Sequence and Transmit Buffer Parameters

| Name | Description |
|---|---|
| TSIZE | Size of the transmit buffer in bytes. |
| TIN | Sequence of the next byte to be placed in the transmit buffer. |
| TOUT | Sequence of the next byte to be sent from the transmit buffer out the port. |
| TPOS | Value of TOUT last reported to the client. |
| TMAX | TOUT report maximum. |
| TTIME | TOUT report time (milliseconds). |
| TREQ | Client requested sequence number. |

TABLE 9

Packet Types

| Nibble 0 | Nibble 1 | Description |
|---|---|---|
| 0 | port 0–15 | Data Packet. 1 byte of data follows for the specified port. |
| 1 | port 0–15 | Data Packet. 2 bytes of data follow for the specified port. |
| 2 | port 0–15 | Data Packet. 3 bytes of data follow for the specified port. |
| 3 | port 0–15 | Data Packet. 4 bytes of data follow for the specified port. |
| 4 | port 0–15 | Data Packet. 5 bytes of data follow for the specified port. |
| 5 | port 0–15 | Data Packet. 6 bytes of data follow for the specified port. |
| 6 | port 0–15 | Data Packet. 7 bytes of data follow for the specified port. |
| 7 | port 0–15 | Data Packet. 8 bytes of data follow for the specified port. |
| 8 | port 0–15 | Data Packet. Byte 1 of the packet specifies 1–255 bytes of data following for the specified port. |
| 9 | port 0–15 | Data Packet. Bytes 1–2 of the packet specify 1–65535 bytes of data following for the specified port. |
| 10 | port 0–15 | Window Sequence Packet. Bytes 1–2 specify a window sequence number. |
| 11 | port 0–15 | Command Packet. Byte 1 specifies a command number which determines the length and format of the data that follows. |
| 12 | port 0–15 | Event Packet. 3 bytes of status follow. |
| 13 | * | Illegal. |
| 14 | * | Illegal. |
| 15 | module 0–7 | Module select Packet. Nibble 1 contains the module number to be selected. |
| 15 | 8 | Module select Packet. Byte 1 specifies a module select code in the range 0–255. |
| 15 | 9–10 | Illegal. |
| 15 | 11 | ID Request packet. Requests an ID response. |
| 15 | 12 | ID Response packet. Byte 1 determines the size of the data which follows. |
| 15 | 13 | Debugging and Control Packet. |
| 15 | 14 | Debug Packet. Specifies a number of following bytes to be utterly ignored. Used for stress testing. |
| 15 | 15 | Reset Packet. Followed by a null-terminated ASCII string describing the reason for the reset. |

TABLE 10

Command Type Assignments & Lengths

| Command Type (byte 1 value) | Command Length (bytes) | Command Name |
|---|---|---|
| 10 | 3 | Open Request |
| 11 | 6 | Open Response |
| 12 | 3 | Synchronize Request |
| 13 | 3 | Synchronize Response |
| 14 | 2 | Sequence Request |
| 15 | 6 | Sequence Response |
| 16 | 2 | Status Request |
| 17 | 5 | Status Response |
| 18 | 6 | Line Error Request |
| 19 | 14 | Line Error Response |
| 20 | 2 | Buffer Request |
| 21 | 6 | Buffer Response |
| 22 | 2 | Port Capability Request |
| 23 | 32 | Port Capability Response |
| 40 | 12 | Set Baud Rate, CFLAGS, IFLAGS, OFLAGS and XFLAGS |
| 42 | 5 | Select Event Conditions |
| 43 | 4 | Set Window Trigger |
| 44 | 5 | Set Modem outputs and Flow Control |
| 45 | 6 | Set High/Low Water marks |
| 46 | 7 | Set Flow Control Characters |
| 47 | 6 | Set RMAX and RTIME |
| 48 | 6 | Set TMAX and TTIME |
| 60 | 3 | Send Character Immediate |
| 61 | 4 | Send Break Immediate |
| 62 | 3 | Flush input/output |
| 63 | 3 | Pause input/output |
| 64 | 3 | Unpause input/output |

TABLE 11

Open Request Packet

| Position | Name | Description |
|---|---|---|
| Nibble 0 | MTYPE | Message type 11: Command. |
| Nibble 1 | PORT | Port number 0–15. |
| Byte 1 | CTYPE | Command type 10: Open Request. |
| Byte 2 | REQ | Request Type:<br>0 = Immediate open<br>1 = Persistent open.<br>2 = Incoming open.<br>3 = Cancel/Close immediate open.<br>4 = Cancel/Close persistent or incoming open. |

TABLE 12

Open Response Packet

| Position | Name | Description |
|---|---|---|
| Nibble 0 | MTYPE | Message type 11: Command. |
| Nibble 1 | PORT | Port number 0–15. |
| Byte 1 | CTYPE | Command type 11: Open Response. |
| Byte 2 | REQ | Request Type:<br>0 = Immediate open<br>1 = Persistent open.<br>2 = Incoming open.<br>3 = Cancel/Close immediate open.<br>4 = Cancel/Close persistent or incoming open. |
| Byte 3 | RESP | Request code:<br>0 = Success.<br>1 = Port busy.<br>2 = No carrier.<br>3 = Resource allocation problem, try again.<br>4 = Request not supported on this device. |
| Bytes 4–5 | PNUM | Actual port number (16*module+port) opened by this request. |

What is claimed is:

1. A system comprising:

a server having a plurality of communication ports; and a host computer having a driver communicatively coupling the host computer to the server via a network connection, wherein the driver emulates the communication ports of the server by defining a corresponding local communication port for each of the communication ports of the server, and further wherein the driver includes an application programming interface (API) by which an application program executing on the host computer is granted full control of one of the communication ports of the server, including hardware and software flow control, as if the communication ports of the server were local to the host computer.

2. The system as claimed in claim 1, wherein the driver maintains a single network connection from the host computer to the server as the application program requests additional local communication ports from the driver.

3. The system of claim 1, wherein the driver defines a TTY device as the local communication port.

4. The system of claim 1, wherein the driver receives input/output (I/O) settings from the application program via the application programming interface, and further wherein the driver communicates the I/O settings to the server for configuring hardware characteristics of the granted server communication port.

5. The system of claim 1 wherein the server communication ports are serial ports.

6. The system of claim 1, wherein the network connection is a TCP connection.

7. The system of claim 1, further comprising a UNIX daemon executing on the host computer for establishing the network connection as a reliable bi-directional bytestream connection over a network, opening a control device associated with the driver, and utilizing a STREAMS interface to link the reliable bytestream network connection to the driver.

8. A hardware device for a host computer, wherein the hardware device includes a driver that emulates a plurality of communication ports of a remote server that is communicatively coupled to the host computer via a network connection, wherein the driver defines a corresponding local communication port for each communication port of the server and includes an application programming interface (API) by which an application program executing on the host computer is granted full control of one of the communication ports of the server, including hardware and software flow control, as if the communication ports of the server were local to the host computer.

9. The hardware device of claim 8, wherein the driver receives requests to control one of the local communication ports from application programs executing on the host computer via a standard application programming interface (API).

10. The hardware device of claim 9, wherein the driver communicates the requests to the terminal server such that the terminal server grants to the host computer exclusive access to one of the communication ports of the terminal server.

11. The hardware device of claim 10, wherein the terminal server grants exclusive access to the server communication port that corresponds to the requested local communication port.

12. The hardware device as claimed in claim 8, wherein the driver maintains a single network connection from the host computer to the server as the application program requests additional local communication ports.

13. The hardware device of claim 8, wherein the driver defines a TTY device as the local communication port.

14. The hardware device of claim 9, wherein the driver receives input/output (I/O) settings from the application program via the application programming interface, and further wherein the driver communicates the I/O settings to the terminal server for configuring hardware characteristics of the terminal server communication port.

15. The hardware device of claim 8, wherein the terminal server communication ports are serial ports.

16. The hardware device of claim 8, wherein the network connection is a TCP connection.

17. The hardware device of claim 8, further comprising a UNIX daemon executing on the host computer for establishing the network connection as a reliable bi-directional bytestream connection over a network, opening a control device associated with the driver, and utilizing a STREAMS interface to link the reliable bytestream network connection to the driver.

* * * * *

(12) EX PARTE REEXAMINATION CERTIFICATE (6915th)
United States Patent
Olson

(10) Number: US 6,047,319 C1
(45) Certificate Issued: Jul. 7, 2009

(54) NETWORK TERMINAL SERVER WITH FULL API IMPLEMENTATION

(75) Inventor: Gene H. Olson, Minneapolis, MN (US)

(73) Assignee: Digi International Inc., Eden Prairie, MN (US)

Reexamination Request:
No. 90/007,001, Apr. 8, 2004

Reexamination Certificate for:
Patent No.: 6,047,319
Issued: Apr. 4, 2000
Appl. No.: 08/682,407
Filed: Jul. 17, 1996

Related U.S. Application Data

(63) Continuation of application No. 08/213,197, filed on Mar. 15, 1994, now abandoned.

(51) Int. Cl.
*H04L 29/08* (2006.01)
*H04L 29/06* (2006.01)

(52) U.S. Cl. .................. 709/223; 709/220; 710/72; 713/100

(58) Field of Classification Search .................. 709/223, 709/220; 710/72; 713/100
See application file for complete search history.

(56) References Cited

U.S. PATENT DOCUMENTS

| | | |
|---|---|---|
| 3,676,858 A | 7/1972 | Finch et al. |
| 4,423,507 A | 12/1983 | Renoulin et al. |
| 4,547,880 A | 10/1985 | De Vita et al. |
| 4,817,130 A | 3/1989 | Frimmel, Jr. |
| 4,866,758 A | 9/1989 | Heinzelmann |
| 4,885,789 A | 12/1989 | Burger et al. |
| 4,972,368 A | 11/1990 | O'Brien et al. |
| 5,142,522 A | 8/1992 | Muramatsu et al. |
| 5,142,622 A | 8/1992 | Owens |
| 5,222,062 A | 6/1993 | Sharma et al. |
| 5,228,137 A | 7/1993 | Kleinerman et al. |
| 5,265,239 A | 11/1993 | Ardolino |
| 5,280,586 A | 1/1994 | Kunz et al. |
| 5,426,421 A | 6/1995 | Gray |
| 5,497,463 A | 3/1996 | Stein et al. |
| 5,568,525 A | 10/1996 | de Nijs et al. |
| 5,619,655 A | 4/1997 | Weng et al. |
| 5,666,534 A | 9/1997 | Gilbert et al. |
| 5,696,901 A | 12/1997 | Konrad |
| 5,754,789 A | 5/1998 | Nowatzyk et al. |
| 5,754,830 A | 5/1998 | Butts et al. |
| 5,812,879 A | 9/1998 | Moro |
| 6,047,319 A | 4/2000 | Olson |
| 2004/0158635 A1 * | 8/2004 | Walls-Manning et al. ... 709/226 |

FOREIGN PATENT DOCUMENTS

| | | |
|---|---|---|
| EP | 0326699 A2 | 8/1989 |
| EP | 0454558 A1 | 10/1991 |
| EP | 0493215 | 7/1992 |

OTHER PUBLICATIONS

Jerry M. Rosenberg; The Dictionary of Computers, Information Processing & Telecommunications (2nd Edition; 1987; p. 409).*

(Continued)

*Primary Examiner*—Majid A. Banankhah

(57) ABSTRACT

A terminal server for providing communicaton between a host computer and a synchronous, asynchronous or parallel communications port across a general purpose network is provided utilizing a unique device driver interface and multiplexing communication protocol. The server communicates data and control commands for multiple ports on a single connection, thereby reducing demands on the network. In addition, genuine TTY devices are made available across the general purpose network which have all the characteristics of local communication ports. The present invention also makes possible access to the ports on the server to multiple host computers located on the network, allowing fair access to shared resources such as modems and printers. Finally, the invention can also be implemented in hardware, further increasing compatibility with existing host computer software and further reducing host computer overhead.

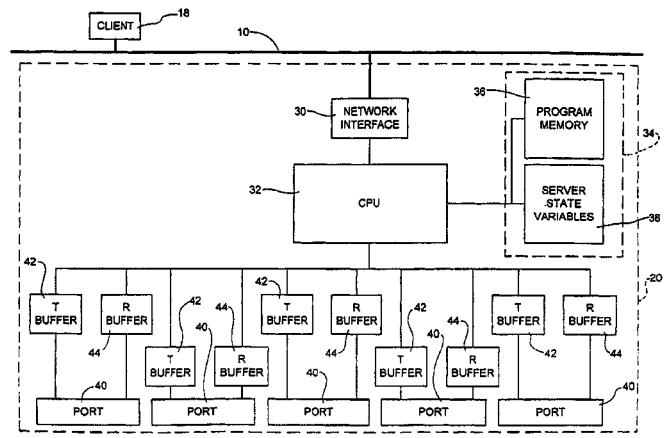

OTHER PUBLICATIONS

*Novell Bullets,* vol. 4, No. 9, (Oct. 1992), 19 pgs.
*UNIX® System V Release 3.0 Intel 80286/80386—Computer Version,* System Administrator's Reference Manual, Prentice Hall, Englewood Cliffs, NJ, (1988), 57 pgs.
*LAN Manager Programmer's Reference (Version 2.0),* Written, edited and produced by Microsoft Corporation, (1990), pp. 582–603; 460–461; 480–493; 156–167.
*Novell Bullets,* vol. 4, No. 11, (Dec. 1992), 16 pgs.
*Novell Bullets,* vol. 5, No. 11, (Dec. 1993), 24 pgs.
"2—Concepts", [on–line]. *ETS/EPS Reference Manual* [retrieved on Feb. 21, 2002]. Retrieved from the Internet: <http://www.lantronix.com/support/docs/html.ets_ref/cncpt.htm>, 20 pgs.
*ACS² SA User's Manual,* Network Products Corporation, Pasadena, CA, (1990–1991), 68 pgs.
*ACS2 User's Manual*—Asynchronous Communications Service, Section Generation—4 Port Edition, (Version 2.10.50), Network Products Corporation, Pasenda, CA, (1989–1993), 139 pgs.
"Alpert Newsgroup Article", *Exhibit 28 of Supplemental Report of Expert Adam Reed, Digi International, Inc. v. Stallion Technologies,* (1994), 3 pgs.
"Apple Computer Glossary", *Exhibit 21 of Supplemental Report of Expert Aam Reed, Digi International Inc. v. Stallion Technologies,* (Oct. 5, 2002), 8 pgs.
"Articom 1.0", (Product Information),(1991), 1 pg.
*ArtiCom Modem Sharing Software*—User's Manual, Artisoft, Tucson, AZ, (1991), 186 pgs.
"ArtiComm® Maintenance Release Installation Instructions", (before Oct. 4, 2002), 2 pgs.
"Artisoft Shares COM Ports (ArtiCom Modem–Sharing Software)", *Lan Technology,* 8, 4, (Citation Only), 1 pg.
"BIOS Interrupt 14h Functions—*Supplement to the Installation Guide for DigiCHANNEL Intelligent Asynchronous Communications Boards Universal DOS Device Driver*", (1991–1993), 51 pgs.
"Chapter 1—The PC Network Environment", *Exhibit 62, Digi International, Inc. v. Stallion Technologies, Inc.* (Jan. 17, 2002), 1–33.
"Chapter 19—Linux Glossary", [online] [retrieved on Oct. 4, 2002]. Retrieved from the Internet: <http://tldp.org/LDP/tlk/appendics/glossary.html>, 5 pgs.
*CNS–010 Installation and User's Guide,* Corollary, Inc., Irvine, CA 92714, (1993), 98 pgs.
"compact.1", *Exhibit 44 of Supplemental Report of Expert Adam Reed, in Digi International Inc. v. Stallion Technologies, Inc.,* (1990), 8 pgs.
"compactDirectory.html, Index of /in383/src/ddj/compact", *Exhibit 45 of Supplemental Report of Expert Adam Reed, in Digi International, Inc. v. Stallion Technologies, Inc.,* (before Oct. 4, 2002), 1 pg.
"Comtrol Cluster Controller Description", (before Oct. 4, 2002), 3 pgs.
"Comtrol Device Driver Installation Instructions", Comtrol, (1992), 29 pgs.
"Customizing Serial Connections on Windows 3.X and Windows for Workgroups—Using COM Redirector", University of California, Santa Barbara, (before Oct. 4, 2002), 3 pgs.
"DECnet for Linux—A Project to Provide DECnet Phase IV Connectivity for Linus", [on–line]. [retrieved on Feb. 21, 2002]. Retrieved from the Internet: <http://linux–decnet.sourceforge.net.lat.html>, 6 pgs.

"Definitions relating to NACS, NASI, NASI Connection Service, and NASI Redirector", (before Oct. 4, 2002), 4 pgs.
"Design Notes", *TruPort User & Reference Manual,* (before Oct. 4, 2002), 1 pg.
"Developer's Kit Check List", Network Products Corporation, Pasadena, CA (2002), 1 pg.
"Dial–in Terminal Service Commands", [on–line]. [retrieved on Feb. 21, 2002]. Retrieved from the Internet: <http://akson.sgh.waw.pl/~chopin/ios120/12supdoc/12cmdsum/12csdial/csterrm.htm>, 24 pgs.
*Dialnet User's Manual for the Portmaster,* Livingston, Inc., (2002), 124 pgs.
"Digi Device Server Solution Guide", [on–line]. [retrieved on Oct. 4, 2002] Retrieved from the Internet: <http://www.vector.kharkov.com/product/digi/appl/solu_guid.htm>, 5 pgs.
*Digi Software Manual—Digi Intelligent Asynchronous Serial Communications Solutions*—Device Drivers for MS–DOS 2.0–6.X, (92000245 Rev A), Digi International, Inc., (1992–1996), 73 pgs.
*Digi Software Manual—Digi Intelligent Serial Communications Boards*—Device Drivers for Microsoft Windows 95, Windows NT, Windows for Workgroups 3.11, Windows 3.1, (92000220 Rev C), Digi International, Inc., (1993–1996), 48 pgs.
"Digi Technical Support—Making Device Networking Easy", [on–line]. [retrieved on Oct. 4, 2002]. Retrieved from the Internet: <http://ftp.digi.com/support/manuals/software/does/dosxem.doc>, 1 pg.
"Digital Equipment Corporation (DEC)—Overview", [on–line]. [retrieved on Jan. 22, 2002]. Retrieved from the Internet: <http://www.digitalcentury.com/encyclo/update.dec.html>, 11 pgs.
"Digital Equipment Corporation Software Product Description—MUXserver 320/380/90 Remote Terminal Server", SPD 32.94.03 (Version 2.0), (Jan. 1994), 26 pgs.
"Digital Networks Software Product Description—Product Name: DECserver Network Access Software, Version 2.4 SD–DNAS0", [on–line]. [retrieved on Feb. 21, 2002]. Retrieved from the Internet: <http://www.dnpg.com/dr/hubs/servers/spd/ SD–DNAS0–00.pdf>, 24 pgs.
"Doupnik Newsgroup Article", *Exhibit 28 of Supplemental Report of Expert Adam Reed, in Digi International, Inc. v. Stallion Technologies, Inc.,* (1992), 3 pgs.
"DTC 16MX Communications Server—Technical Data", Hewlett–Packard Company, (1993), 6 pgs.
"DTC 16RX Routable Communications Server & DTC 16 RX Manager", Hewlett–Packard Company, (1994), 7 pgs.
"Dunn Newsgroup Article", *Exhibit 58 of Supplemental Report of Expert Adam Reed, in Digi International, Inc. v. Stallion Technologies, Inc.,* (1992), 3 pgs.
*Easyreach User Manual,* Version 1.8 (Documentation Revision 1.2, Issue 2),(Apr. 19, 1996), 139 pgs.
"Errno.html—Introduction to System Calls and Error Numbers", *Exhibit 38 of Supplemental Report of Expert Adam Reed, in Digi International, Inc. v. Stallion Technologies, Inc.,* (before Oct. 4, 2002), 30 pgs.
"Expert Report of Professor Simon Kaplan", *Digi International, Inc. v. Stallion Technologies Pty. Ltd,* Supreme Court of Queensland, Registry: Brisbane; No. S7240 of 2001 (Australia), (Sep. 20, 2002), 79 pgs.
"FAXserve™ Information", Computer Associates (before Oct. 4, 2002), 2 pgs.

"Fresh Technology Company Provides Solution for Managing Enterprise–Wide Asynchronous Communications With New Modem Assist Plus™ Software", *Fresh Technology Co. News Release*, (1991), 2 pgs.

"Fundamentals of NetBIOS and LANtastic Networks", *Exhibit 37 of Supplemental Report of Expert Adam Reed in Digi International, Inc. v. Stallion Technologies, Inc.*, (1995), 43 pgs.

"Greenleaf CommLib 5.2 Summary", (1995–2001), 6 pgs.

"Guide to NCSIport", *Exhibit 53 of Supplemental Report of Expert Adam Reed, in Digi International Inc. v. Stallion Technologies, Inc.*, (2002), 3 pgs.

"Hostess Multiport Serial Controllers", Comtrol®, (1992), 1 pg.

"Ignatio Newsgroup Article", *Exhibit 50 of Supplemental Report of Expert Adam Reed, in Digi International, Inc. v. Stallion Technologies, Inc.*, (observed Oct. 4, 2002), 8 pgs.

"Installing and Configuring the NMP2 on a Windows for Workgroups Network", (2002), 5 pgs.

"Installing and Using Articom—Module ARTCOM.01", (1995), 35 pgs.

"Little Big Lan", *Exhibit 27 of Supplemental Report of Expert Adam Reed, in Digi International v. Stallion Technologies, Inc.*, (before Oct. 4, 2002), 5 pgs.

"Loading NCSI With Windows", *Exhibit 54 of Supplemental Report of Expert Adam Reed, in Digi International, Inc. v. Stallion Technologies, Inc.*, (2002), 1 pg.

*Local Area Transport (LAT) Architecture*, Digital Equipment Corporation, (1986), 43 pgs.

*Local Area Transport (LAT) Network Concepts*, Digital Equipment Corporation, (1988), 152 pgs.

"makefile.html", *Exhibit 42 of Supplemental Report of Expert Adam Reed, in Digi International, Inc. v. Stallion Technologies, Inc.*, (1990), 1 pg.

"Method to Send Input/Output Controls to a High Function Terminal", *IBM Technical Disclosure Bulletin*, vol. 31, No. 1,(Jun. 1988), p. 46.

"Mikem Newsgroup Article", *Exhibit 30 of Supplemental Report of Expert Adam Reed, in Digi International, Inc. v. Stallion Technologies, Inc.*, (1993), 3 pgs.

Nabil Newsgroup Article, *Exhibit 31 of Supplemental Report of Expert Adam Reed, in Digi International, Inc. v. Stallion Technologies, Inc.*, (1992), 5 pgs.

"Netware Connect Slide Presentation", *Novell Presentation Library*, (1993), 25 pgs.

"NetWare's Buyer's Guide Apr. 1992/Dial–In/Dial–Out Connectivity Products", (1992), 122 pgs.

*Netware® Connect™ Info Guide*, (1993), 72 pgs.

"Network Communications Services Interface—NCSI—Command Interpreter Reference", *Exhibit 52 of Supplemental Report of Expert Adam Reed, in Digi International, Inc. v. Stallion Technologies, Inc.*, (1989), 2 pgs.

"Network Products Corporation", Corporate Information, (2002), 1 pg.

"Networked Modem Instations (Novell, Interrupt 14, EICON, NCS, NACS, Non–Novell)", (before Oct. 4, 2002), 19–34.

"NMP2 Developer's Kit Checklist", (before Oct. 4, 2002), 1 pg.

"Novell: NetWare Connect 2: Detail View", (1999),4 pgs.

*NTERM² Terminal Utility—User's Guide*, (1993), 6 pgs.

"Olson Newsgroup Article", *Exhibit 26 of Supplemental Report of Expert Adam Reed, in Digi International, Inc. v. Stallion Technologies, Inc.*, (2002), 1 pg.

*Overview of Terminal Server Products*, Digital Equipment Corporation, (1986), 27 pgs.

"Performance Test relating to the EasyServer System", (See pp. 27–33 of *Expert Report of Simon Kaplan, in Digi Internatonal, Inc. v. Stallion Technologies, Inc.*), (before Sep. 20, 2002), 1 pg.

*Pluto On–Line Debugger (POD)*, Digital Equipment Corporation,(1985), 53 pgs.

"Polmax Home Page and BBS–1 Files on Polmax Web", [on–line]. [retrieved on Jul. 18, 2002]. Retrieved from the Internet: <http://www.polmax.com/pl/>, 21 pgs.

*PortMaster User's Manual—PM–11 Communications Expander & Terminal Server*, (Jul. 29, 2002), 93 pgs.

"Press Release—Taking Risks Reaps Award—Equisys Win the Queen's Award for Export", (1999), 2 pgs.

"Protocol Standard for a NetBIOS Service on a TCP/UDP Transport: Concepts and Methods", *Network Working Group, Request for Comments: 1001*, (1987), 64 pgs.

"Protocol Transfer User Commands", [on–line]. [retrieved on Feb. 21, 2002]. Retrieved from the Internet: <http://dogbert.wu–wien.ac.at/UniverCD/cc/td/doc/product/software/ssr90/ptc__r__90/43561/htm>, 36 pgs.

"Readme.html", *Exhibit 41 of Supplemental Report of Expert Adam Reed, in Digi International, Inc. v. Stallion Technologies, Inc.*, (1990), 1 pg.

"Remote File Sharing Utilities Release 1.0 Release Notes", In: *Unix® System User's Manual*, Release 5.0, published by Prentice–Hall, Inc. Englewood Cliffs, NJ, (Jun. 1982), 169–175.

*SmartPort Plus™—Intelligent Serial Port Board User's Manual*, Arnet Corporation, (1991), 84 pgs.

"Stackware Linux Essentials", [on–line]. [retrieved on Oct. 4, 2002]. Retrieved from the Internet: <http://wwwacs.gantep.edu/tr/linux/slackware–book/slakbook/g4292.html>, 9 pgs.

"SunOS2 (Technical Name of Solaris 2) Manual", doc.sun.com—Sun Product Documentation, *Exhibit 25 of Supplemental Report of Expert Adam Reed, in Digi International, Inc. v. Stallion Technologies, Inc.*, (2002), 26 pgs.

"Telnet Options", (listing of Telnet Protocol options that may be negotiated), (before Oct. 4, 2002), 9 pgs.

*Terminal Server Installation*, Digital Equipment Corporation,(1986), 39 pgs.

*Terminal Server Internals*, Digital Equipment Corporation, (1986), 68 pgs.

*Terminal Server Management*, Digital Equipment Corporation,(1986), 38 pgs.

*Terminal Server Presales*, Digital Equipment Corporation, (1986),59 pgs.

*Terminal Server Support—Student Guide*, Digital Equipment Corporation, (1986), 21 pgs.

*Terminal Server Troubleshooting*, Digital Equipment Corporation, (1986), 37 pgs.

"Terminal Servers vs. Multiplexers—The True Story", Data Comm for Business, Inc., (before Oct. 4, 2002), 6 pgs.

"Terminal Service Connections", [on–line]. [retrieved on Feb. 21, 2002]. Retrieved from the Internet: <http://www.cisco.com/univercd/cc/td/doc/product/software/ios102/cacg__doc/49043.htm>, 10 pgs.

*Terminal Service User Interface*, Digital Equipment Corporation, (1986), 24 pgs.

"TS 5212: Introduction to Telecommunication System—Improving Data Communication Efficiency", (before Oct. 4, 2002), 5 pgs.

*UNIX System V/386 Release 3.2 System Administrator's Reference Manual*, Prentice Hall, Englewood Cliffs, NJ, (1989), 10 pgs.

"Unix Manual Page for cu", (before Oct. 4, 2002), 2 pgs.

*UNIX System V—Utilities Release Notes*, (AT & T), (1987), 6 pgs.

*User's Guide to the COMTROL® Hostess Cluster™ Intelligent Serial I/O Subsystem*, Comtrol, (1992), 60 pgs.

*User's Manual for NMP²—Network Modem Program*, Network Products Corporation, (1989, 1991), 67 pgs.

*VMS I/O User's Reference Manual: Parts I and II*, (Digital Equipment Corporation), (1988), 566 pgs.

"White Paper: Creating a NLM–Based Communications Server", (1999), 7 pgs.

Baker, S, "How Well do Network Redirectors Perform?", Stuart Baker Software, La Mesa, CA 91941, (1992), 4 pgs.

Baker, S., "Network Redirectors Revisited", Stuart Baker Software, La Mesa, CA 91941, (1993), 8 pgs.

Bennett, M., "Telnet Remote Serial Port (RSF) Option", *Network Working Group*, (Dec. 1996), 6 pgs.

Brandt, R. B., "STARLAN: Local–Area Networking on Twisted–Pair Wiring", *AT& T Technology*, 3(1), (1988), 32–39.

Cameron, P., et al., "Transport Multiplexing Protocol (TMux)", *Network Working Group, Request for Comments: 1692*, (1994), 12 pgs.

Clark, G., "Telnet Com Port Control Option", *Network Working Group*, (Jul. 1997), 10 pgs.

Clark, G., "Telnet Com Port Control Option", *Network Working Group, Request for Comments: 2217*, (Oct. 1997), 13 pgs.

Clark, G., "Telnet Comport Control Option", *Network Working Group*, (Nov. 1996), 5 pgs.

Clark, G., "Telnet Comport Control Option", *Network Working Group*, (Mar. 1997), 3 pgs.

Clark, G., "Telnet Comport Control Option (Version 03)", *Network Working Group*, (May 1997), 8 pgs.

Clarke IV, D. J., *The Complete NeWare® Construction Kit*, John Wiley & Sons, Inc., (1993), 26–27; 50–51; 76–79; 234–237.

Dorshink, B., "Fresh Assists Modems (Fresh Tecnhology Co.'s Modem Assist Plus 2.0 Communications Software)", *LAN Technology*, 8(4), (Citation Only), (1992), 1 pg.

Eagan, J. I., et al., *Writing a Unix™ Device Driver*, John Wiley & Sons, Inc., (1988), 24–25.

Felps, R., *Illustrated UNIX® System V/BSD*, Wordware Publishing, Inc., Plano, TX, (1992), 26–27.

Harris, D., "Chapter 7—Remote File System", In: *UNIX® Networking*, Kochan, S. G., et al., Editors, Pipeline Associates, Inc., (1990), 203–235.

Heldenbrand, D., "Users of Novell's PC networks now can branch out (GCN Spotlight: Local Area Networks)", *Government Computer News*, vol. 7, No. 4, (Computer Library Periodicals, Doc. #35979), (1988), 6 pgs.

Jerney, J., et al., *Maximizing Novell Netware*, New Riders Publishing, Carmel, IN, (1992), pp. 20–31; 5769; 85–93; 174–196; 339–340; 356–359; 384–395; 434–441.

Kincaid, S. R., "Articom 1.0 Software Investigation Research Summary", (2002), 38 pgs.

Loskin, P., "Modem Assist Plus Dials to Save Dollars (Synergy Solutions Modem–Sharing Software) (Software Review)", *PC World*, 12(7), (2000), 2 pgs.

Malamud, C., "Chapter 7—LAT", *Analyzing DECnet/OSI Phave V*, Van Nostrand Reinhold, New York, NY, (1991), 211–241.

Merenbloom, P., "Fresh Offers Modem–Sharing Bargain (Fresh Technology Group Inc.'s Modem Assist Peripheral Sharing Device) (Software Review)", (Abstract Only), *PC Week*, 8(1), (1991), 1 pg.

Nguyen, T., et al., "Chapter 18 Device I/O Control Functions", In: *Advanced Programmer's Guide to OS/ 2*, Simon & Schuster, Inc., New York, NY 10023, (1989), 20 pgs.

Niedermiller–Chaffins, D., *Inside Novell NetWare, Special Edition*, New Riders Publishing, Carmel, IN, (1992), pp. 48–49; 82–85; 88–89;108–137; 386–387; 394–397; 491–494; 502–505; 525–527; 549–551; 730–731.

Olson, G. H., "Data Compression Program", *Exhibit 43 of Supplemental Report of Expert Adam Reed, in Digi International, Inc. v. Stallion Technologies, Inc.*, (1990), 62 pgs.

Olson, G. H., "Shared Memory Communications Library", *Exhibit 39 of Supplemental Report of Expert Adam Reed, in Digi International, Inc. v. Stallion Technologies, Inc.*, (before Oct. 4, 2002), 13 pgs.

Olson, G. H., "Shared Memory Test Program", *Exhibit 40 of Supplemental Report of Expert Adam Reed, in Digi International, Inc. v. Stallion Technologies, Inc.*, (before Oct. 4, 2002), 3 pgs.

Padovano, M., "Chapter 5—Applications Using RFS and NFS", In: *Networking Applications on UNIX System V, Release 4*, Prentice–Hall, Inc., Englewood Cliffs, NJ 07632, (1993), 131–146.

Panzieri, F., et al., "Interfacing UNIX to Data Communications Networks", *IEEE Transactions on Software Engineering, vol. SE–11(10)*, (1985), 1016–1031.

Papachristou, C. a., et al., "Vertical Migration of Software Functions and Algorithms Using Enhanced Microsequencing", *IEEE Transactions on Computers*, 42(1), (1993), 45–60.

Peterson, J. L., et al., *Operating Systems Concepts*, Addison–Wesley Publishing Company, Inc., (1983), 512–513.

Postel, J., et al., "Telnet Option Specifications", *Network Working Group, Request for Comments: 855*, (1983), 3 pgs.

Postel, J., et al., "Telnet Protocol Specification", *Network Working Group, Request for Comments: 854*, (1983), 15 pgs.

Ramos, E., et al., *Data Communications and Networking Fundamentals Using Novell NetWare*, Macmillan Publishing Company, New York, NY, (1992), pp. 190–192, 392–394.

Reed, A., "Claim Chart—US 6,047,319 Compared to ArtiCom", (Before Oct. 4, 2002), 6 pgs.

Reed, A., "Claim Chart—Corresponding Feature in US 6,047,319 Compared to RFS", (Before Oct. 4, 2002), 11 pgs.

Reed, A., "Claim Chart—US 6,047,319 Compared to ACS2", (Before Oct. 4, 2002), 5 pgs.

Reed, A., "Claim Chart—US 6,047,319 Compared to DecNet", (Before Oct. 4, 2002), 5 pgs.

Reed, A., "Claim Chart—US 6,047,319 Compared to Livingston", (Before Oct. 4, 2002), 5 pgs.

Reed, A., "Claim Chart—US 6,047,319 Compared to Novell NACS with NASI", (Before Oct. 4, 2002), 14 pgs.

Reed, A., "Claim Chart—US 6,047,319 Compared to Transactions on Software Engineering", (Before Oct. 4, 2002), 6 pgs.

Reed, A., "Claim Chart—US 6,047,319 Compared to US 5,497,463" (Before Oct. 4, 2002), 5 pgs.

Reed, A., "Claim Chart re: US 6,047,319", (Attached to *Report of Adam Reed in Digi International, Inc. v. Stallion Technologies, Inc.*, (before Jul. 22, 2002), 35 pgs.

Reed, A., "Report of Expert Adam Reed", *Digi International, Inc. v. Stallion Technologies, Inc.*, (United States District Court for the District of Minnesota, Court File No. 00–2565 JRT/FLN), (Jul. 22, 2002), 5 pgs.

Reed, A., "Resume of Adam Reed", (Jul. 18, 2002), 3 pgs.

Reed, A., "Supplemental Report of Expert Adam Reed on Patent Invalidity and Unenforceablity", *Digi International, Inc. v. Stallion Technologies, Inc.*, (United States District Court for the District of Minnesota, Court File No. 00–2565 JRT/FLN,(2002), 10 pgs.

Reiss, L., et al., *UNIX System Administration Guide*, Osborne McGraw–Hill, Berkeley, CA 94710,(1993), pp. 197–198; 291–192.

Rifkin, A. P., et al., "RFS Architectural Overview", *USENIX Conference Proceedings*, (1986), 248–259.

Ryan, R., *Microsoft® Lan Manager—A Programmer's Guide*, Microsoft Press, Redmond, WA 98052–6399, (1990), pp. 12–15, 106–111, 204–209, 396–403.

Schlieve, P. L., et al., *Novell Netware—Advanced Techniques and Applications*, Woodware Publishing, Inc., Plano, TX 75074, (1990), p. 175.

Sheldon, T., *Novell® NetWare® 386: The Complete Reference*, McGraw–Hill, Inc. Berkeley, CA 94710, (1990), pp. 70–71, 124–127; 756–757; 770–771.

Silberschatz, A., et al., *Operating System Concepts*, Fifth Edition, Addison–Wesley Longman, Inc.,(1998), 408–409.

Silvester, P. P., *The UNIX™ System Guidebook—An Introductory Guide for Serious Users*, Springer–Verlag, (1983), 68–69.

Sinha, A., "Client–Server Computer—Time–Shared Computing", *Communications of the ACM*, 35(7), (1992), 77–98.

Stevens, W. R., *Advanced Programming in the UNIX® Environment*, Addison–Wesley Professional Computing Series, Addison–Wesley Publishing Company, Reading, MA, (1992), pp. 325–343, 490–514, 63.

Stevens, W. R., "Chapter 13—Daemon Processes", In: *Advanced Programming in the UNIX® Environment*, Addison–Wesley Publishing Company, Reading, MA 01867,(1992), 415–417.

Stevens, W. R., "Chapter 19—Pseudo Terminals", In: *Advanced Programming in the UNIX® Environment*, Addison–Wesley, (1992), 631–657.

Stewart, B., "Definitions of Managed Objects for Character Stream Devices Using SMIv2", *Network Working Group, Request for Comments: 1658*, (1994) 17 pgs.

Stewart, B., "Definitions of Managed Objects for RS–232–like Hardware Devices Using SMIv2", *Network Working Group, Request for Comments: 1659*, (1994), 20 pgs.

Sturgill, M., "Claim chart re: US 6,047,319—References to the Novell and RFS Products", (before Jul. 22, 2002), 18 pgs.

Sturgill, M., "Report of Expert Michael Sturgill", *Digi International, Inc. v. Stallion Technologies, Inc.*, United States District Court for the District of Minnesota (Court File No. 00–2565 JRT/FLN), (Jul. 22, 2002), 5 pgs.

Sturgill, M. W., "Resume of Michael W. Sturgill", (before Oct. 4, 2002), 4 pgs.

Sturgill, M., et al., "Supplemental Report of Expert Michael Sturgill on Patent Invalidity and Unenforceability", *Digi International, Inc. v. Stallion Technologies, Inc.*, (United States District Court for the District of Minnesota, Court File No. 00–2565 JRT/FLN), (Oct. 4, 2002), 9 pgs.

Tanenbaum, A. S., "Section 1.4. Hardware, Software, and Multilevel Machines", In: *Structured Computer Organization*, (3rd Edition, Prentice Hall, Englewood Cliffs, NJ 07632), (1990), p. 11.

Topham, D. W., *A System V Guide to UNIX and XENIX*, Springer–Verlag, New York, NY, (1990), pp. 69–70; 76.

Udell, J., "LAN Manager 2.0: A Force to Be Reckoned With", *BYTE* Magazine, (Dec. 1990), 3 pgs.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–17 is confirmed.

New claims 18–26 are added and determined to be patentable.

*18. The system of claim 1, wherein the network connection is an Ethernet connection.*

*19. The system of claim 1, wherein the network connection uses a standard networking communications protocol, wherein the standard networking communications protocol provides error free byte stream data transmission.*

*20. The system of claim 1, wherein the standard networking communications protocol is TCP/IP.*

*21. A system comprising:*
  *a general purpose network;*
  *a server connected to the general purpose network, the server having a plurality of communication ports; and*
  *a host computer connected to the general purpose network, the host computer having a driver communicatively coupling the host computer to the server via a standard networking communications protocol operating over the general purpose network, wherein the driver emulates the communication ports of the server by defining a corresponding local communication port for each of the communication ports of the server, and further wherein the driver includes an application programming interface (API) by which an application program executing on the host computer is granted full control of one of the communication ports of the server, including hardware and software flow control, as if the communication ports of the server were local to the host computer.*

*22. The system of claim 21, wherein the standard networking communications protocol is TCP/IP.*

*23. The system of claim 21, wherein the standard networking communications protocol provides error free byte stream data transmission.*

*24. The system of claim 21, wherein the general purpose network includes an ethernet network.*

*25. The system of claim 21, wherein the general purpose network includes a token ring network.*

*26. The system of claim 21, wherein the host computer transmits packets of data to the server over the network to a server transmit buffer corresponding to a server communication port, and wherein the data is transmitted from the transmit buffer as a serial communication packet.*

\* \* \* \* \*

US006047319C2

(12) EX PARTE REEXAMINATION CERTIFICATE (7667th)
United States Patent
Olson

(10) Number: US 6,047,319 C2
(45) Certificate Issued: Aug. 3, 2010

(54) NETWORK TERMINAL SERVER WITH FULL API IMPLEMENTATION

(76) Inventor: Gene H. Olson, 801 Church St., Apt. No. 1233, Mountain View, CA (US) 94041

Reexamination Request:
No. 90/010,470, Apr. 29, 2009

Reexamination Certificate for:
Patent No.: 6,047,319
Issued: Apr. 4, 2000
Appl. No.: 08/682,407
Filed: Jul. 17, 1996

Reexamination Certificate C1 6,047,319 issued Jul. 7, 2009

Related U.S. Application Data

(63) Continuation of application No. 08/213,197, filed on Mar. 15, 1994, now abandoned.

(51) Int. Cl.
*H04L 29/06* (2006.01)
*H04L 29/08* (2006.01)

(52) U.S. Cl. .................. 709/223; 709/220; 710/72; 713/100

(58) Field of Classification Search .................. 709/223
See application file for complete search history.

(56) References Cited

U.S. PATENT DOCUMENTS

| 4,773,001 A | * | 9/1988 | Blair et al. ............. 340/825.52 |
| 5,355,365 A | | 10/1994 | Bhat |
| 5,564,061 A | | 10/1996 | Davies |

OTHER PUBLICATIONS

NetWare Buyer's Guide, Apr. 1992/NetWare Asynchronous Communications Server (NACS) v3.0 (1992).

* cited by examiner

*Primary Examiner*—Alexander J Kosowski

(57) ABSTRACT

A terminal server for providing communication between a host computer and a synchronous, asynchronous or parallel communications port across a general purpose network is provided utilizing a unique device driver interface and multiplexing communication protocol. The server communicates data and control commands for multiple ports on a single connection, thereby reducing demands on the network. In addition, genuine TTY devices are made available across the general purpose network which have all the characteristics of local communication ports. The present invention also makes possible access to the ports on the server to multiple host computers located on the network, allowing fair access to shared resources such as modems and printers. Finally, the invention can also be implemented in hardware, further increasing compatibility with existing host computer software and further reducing host computer overhead.

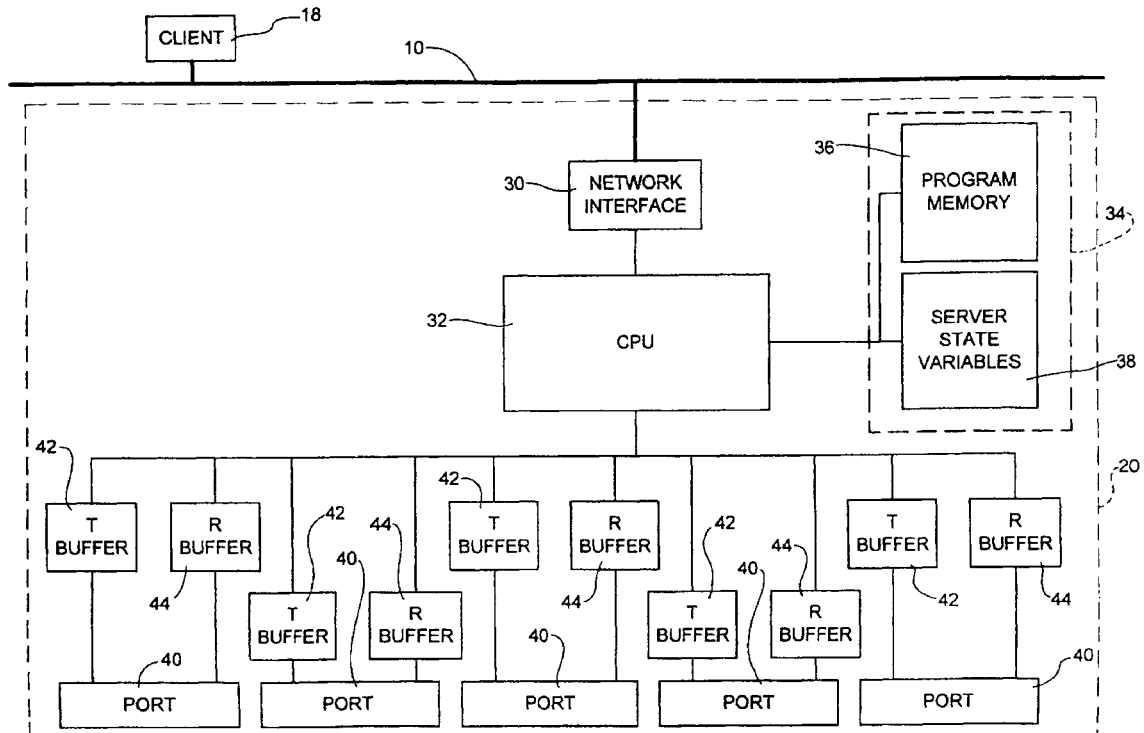

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-26 is confirmed.

New claims 27-28 are added and determined to be patentable.

*27. The system of 21, wherein the driver emulates a driver of a hardware device as if the hardware device was local to the host computer.*

*28. The system of 1, wherein the driver emulates a driver of a hardware device as if the hardware device was local to the host computer.*

\* \* \* \* \*